May 5, 1959 G. T. BAKER 2,885,482

AUTOMATIC TELEPHONE SYSTEMS

Filed July 9, 1956 12 Sheets-Sheet 1

Inventor George Thomas Baker
by Dennie Steinberg
Attorney

Inventor George Thomas Baker
by [signature]
Attorney

Inventor George Thomas Baker
by Dennis Stanley
Attorney

Inventor George Thomas Baker
by Dennis Steinling
Attorney

Inventor George Thomas Baker
by Deane Steinberg
Attorney

Inventor George Thomas Baker
by Deane Steinberg
Attorney

May 5, 1959 G. T. BAKER 2,885,482

AUTOMATIC TELEPHONE SYSTEMS

Filed July 9, 1956

12 Sheets-Sheet 7

Inventor George Thomas Baker
by Decive Steinberg
Attorney

May 5, 1959 G. T. BAKER 2,885,482

AUTOMATIC TELEPHONE SYSTEMS

Filed July 9, 1956 12 Sheets-Sheet 8

Inventor George Thomas Baker
by Dennis Steinberg
Attorney

May 5, 1959 G. T. BAKER 2,885,482

AUTOMATIC TELEPHONE SYSTEMS

Filed July 9, 1956 12 Sheets-Sheet 9

Inventor George Thomas Baker
by Deane Stinchey
Attorney

May 5, 1959 G. T. BAKER 2,885,482

AUTOMATIC TELEPHONE SYSTEMS

Filed July 9, 1956

12 Sheets-Sheet 10

Inventor George Thomas Baker
by [illegible]
Attorney

Inventor George Thomas Baker
by Dennis Shimmy
Attorney

Inventor George Thomas Baker
by Deane Sturdevant
Attorney 2,885,482

AUTOMATIC TELEPHONE SYSTEMS

George Thomas Baker, Taplow, England, assignor to British Telecommunications Research Limited, Taplow, England, a British company Application July 9, 1956, Serial No. 596,684

Claims priority, application Great Britain July 11, 1955

18 Claims. (Cl. 179—18)

The present invention relates to automatic telephone systems and is more particularly concerned with systems in which the setting up of connections over automatic switches is controlled by high-speed registers of the magnetic drum type.

The use of magnetic drums for effecting various control operations in telephone systems is already known but in general such drums as hitherto proposed have been arranged to respond to impulses dialled by a calling party and to produce similar or translated trains of impulses for setting up automatic switches to complete the connection. Such an arrangement, though possibly desirable where switches of known type with conventional circuits have to be controlled in consequence of existing equipment, does not exploit to the full the advantages of magnetic drum control both as regards speed of operation and economy in equipment.

The present invention contemplates effecting direct control of the different switches in accordance with information relating thereto which is stored on the drum so that the switches themselves do not need to perform any hunting operation but that the drum control decides which switch is to be operated and to which position so that the actual setting up of the connection can be effected in the minimum of time.

The invention will be better understood from the following description of one method of carrying it into effect which should be taken in conjunction with the accompanying drawings. These show the application of the invention to a 200-line exchange employing crossbar switches. It is assumed that in these circumstances it will be satisfactory to employ five primary switches and five secondary switches and in the system which will be described, it is assumed that twenty transmission bridges are provided for internal traffic. The crossbar switches are assumed to be of the type well-known in which select magnets serve to position corresponding rows of spring fingers so that on the subsequent operation of a bridge magnet serving for the co-ordinate direction, the contact springs at the intersection are operated and are retained operated as long as the bridge magnet is energised though the select magnet is subsequently released. It is assumed that each switch is provided with ten bridges and that there are twelve horizontal levels, that is to say twelve select magnets. Incoming connections are extended to ten only of these levels however and levels 11 and 12 are employed for effecting so-called wiper switching in a manner which is generally known and will be described in detail in due course.

Figure 1:
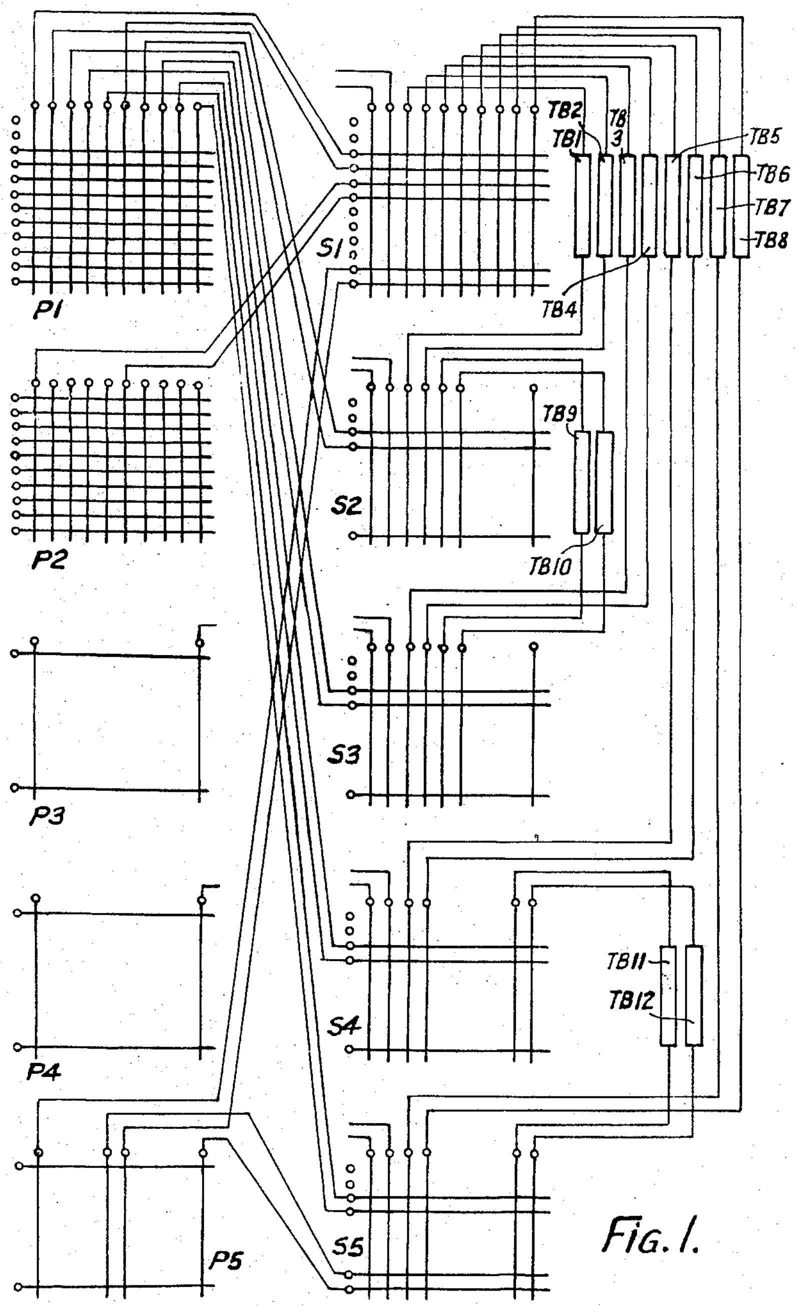
Figure 2:
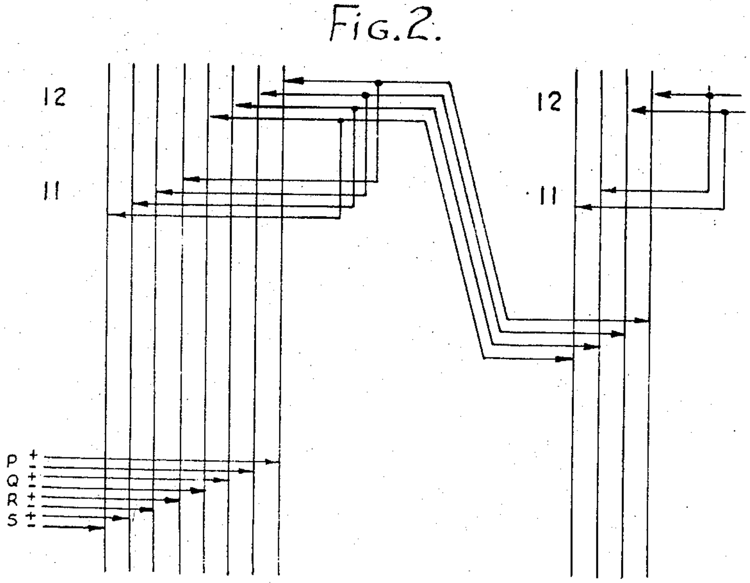
Figure 8:
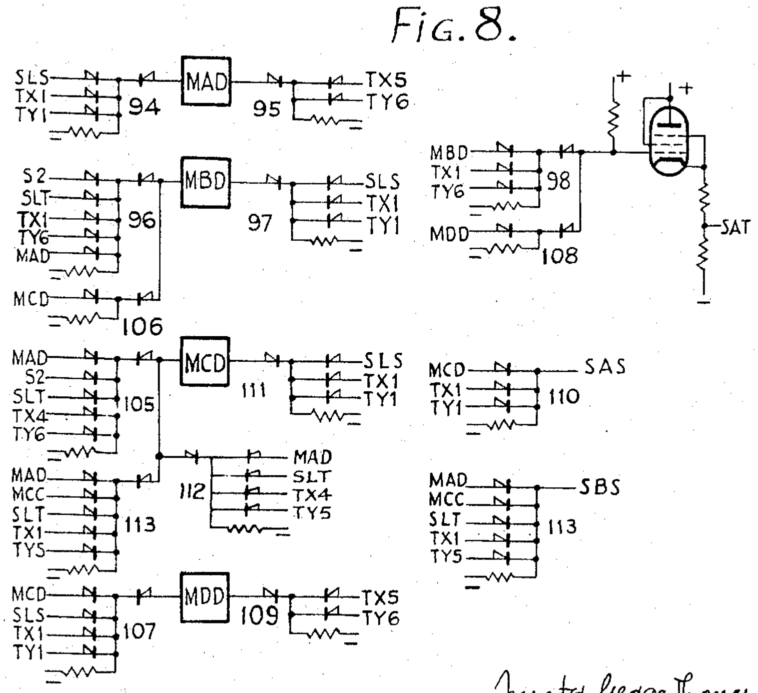
Figure 3:
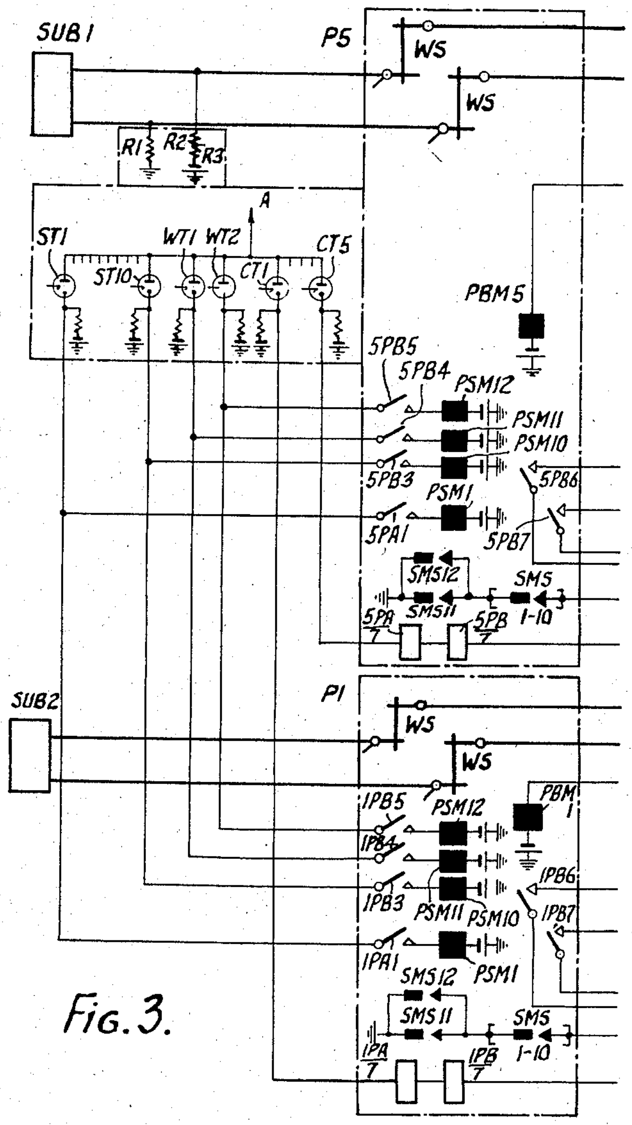
Figure 4:
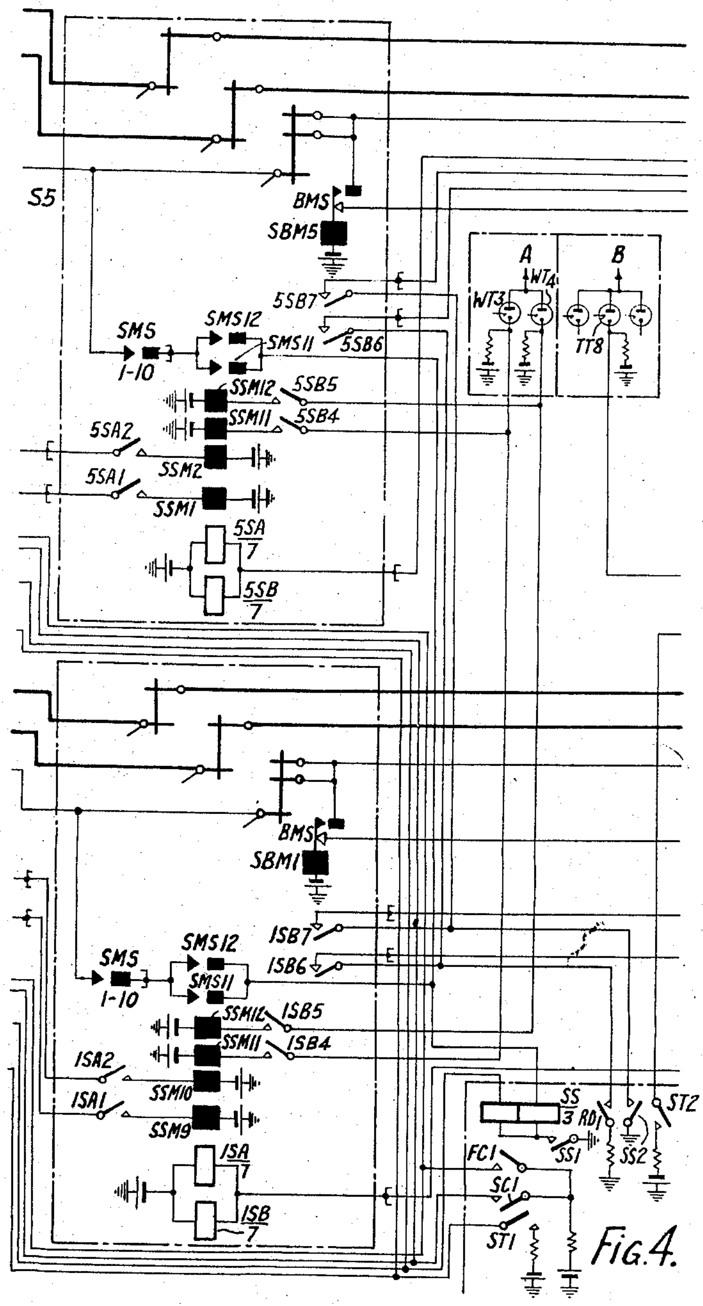
Figure 5:
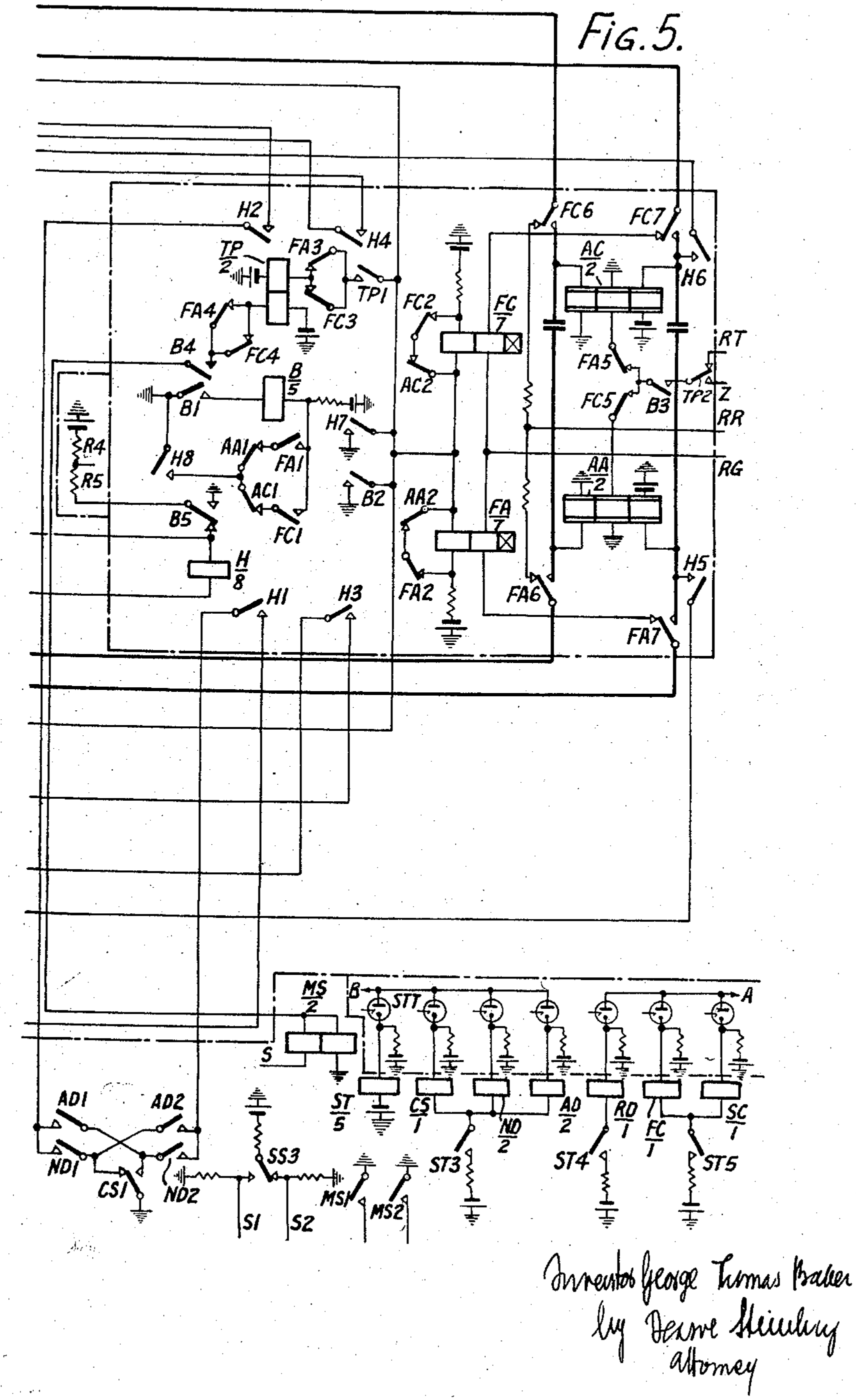

Fig. 1 of the drawings shows the general layout of the primary and secondary switches and the connection of the transmission bridges, Fig. 2 shows the wiper switching arrangements, Figs. 3, 4 and 5, which should be fitted together with Fig. 4 between Figs. 3 and 5, show details of the switch circuits, while Figs. 6–13 indicate in the manner now well understood the various coincidence circuits which serve for the control of the magnetic drum.

Referring first to Fig. 1, as already explained the exchange is served by five primary and five secondary switches and the subscribers' lines are assumed to be connected to levels 1–10 of the primary switches. The vertical connections or bridges are arranged so that all the bridges of primary switch P1 extend to levels 9 and 10 of the secondary switches, bridges 1 and 6 being connected to the first secondary switch S1, bridges 2 and 7 to the second secondary switch S2 and so on. In a similar way the bridges of the second primary switch P2 are connected to levels 7 and 8 of the different secondary switches, two to each secondary switch. Thus bridges 1 and 6 of the second primary switch P2 extend to levels 7 and 8 of the first primary switch S1 and similarly for the other secondary switches. The same principle is applied for the other primary switches so that for instance bridges 5 and 10 of the fifth primary switch P5 will extend to levels 1 and 2 of the fifth secondary switch S5.

The bridges of the secondary switches are connected together to opposite sides of the transmission bridges and as already mentioned it is considered that the local traffic can be dealt with by providing twenty transmission bridges. These are connected between bridges 3–10 of the various secondary switches, bridges 1 and 2 in each case being assumed to be reserved for outgoing junctions or to provide access to a manual board. As shown in Fig. 1, it is assumed that bridges 3 and 4 of switch S1 are connected by way of transmission bridges TB1 and TB2 to bridges 3 and 4 of switch S2, bridges 5 and 6 of switch S1 are connected by transmission bridges TB3 and TB4 to bridges 3 and 4 of switch S3, bridges 7 and 8 of switch S1 are connected to transmission bridges TB5 and TB6 which are also connected to bridges 3 and 4 of switch S4 and similarly transmission bridges TB7 and TB8 are associated with bridges 9 and 10 of switch S1 and 3 and 4 of switch S5. Similarly transmission bridges TB9 and TB10 are associated with bridges 5 and 6 of switches S2 and S3, transmission bridges TB11 and TB12 are associated with bridges 9 and 10 of switches S4 and S5 and the remaining eight transmission bridges are connected in a similar manner.

It will be appreciated that with this arrangement a completed connection is symmetrical as regards the calling and called parties and that each side of the connection will involve one primary and one secondary switch. The connections between the primary and secondary switches, which will be referred to as links, are such that there are a plurality of possible routes over which a connection may be set up and if the exchange is otherwise idle, any connection may be set up over any secondary switch and any link accessible to the relevant primary switch as regards both the calling and called parties. With normal traffic however the possibilities are reduced and at times it may be impossible to complete a connection even though the called party is free because there are no suitable links available. It may be pointed out also that in view of the symmetrical nature of the connections and the fact that the switches are not directly controlled by the calling subscribers but are set up from the drum, it is possible for either calling or called party to be connected to either end of the transmission bridge. Thus though it will be considered normal that the calling party is connected to the "top" of the transmission bridge as shown in Fig. 1 and the called party to the "bottom," it may sometimes be necessary to reverse this arrangement because the connection cannot be completed in the straight or normal manner but can be completed in the reverse or abnormal manner.

Referring now to Fig. 2, it should be explained that with crossbar switches as normally constructed it is readily possible to arrange for eight pairs of contacts to be closed at each crossing point. With the assumed arrangement of the exchange incorporating the invention however, only the speaking leads need to be switched, that is to say only two conductors are concerned, and consequently each crossing point can deal with four subscribers.

In order to discriminate between the four subscribers, so-called wiper switching is employed, both in the primary switches and in the secondary switches. Thus on each type of switch, it is arranged that when a connection is made, the corresponding crossing point will be closed for either level 11 or level 12 and thus only four wires of the eight are connected up over the outgoing circuit which always extends from one or other of these levels rather than direct from the vertical commoning. Obviously levels 11 and 12 must be differently wired compared with levels 1—10 in that there is no horizontal commoning for levels 11 and 12. Each link therefore comprises these four wires representing two pairs of speaking leads, together with a fifth wire which is used for the operation of the bridge magnet of the appropriate primary switch and hence does not involve the contacts of the primary switch. In the secondary switch, a similar arrangement is used, namely that the appropriate crossing point on either level 11 or level 12 is closed so that two wires out of the four speaking wires forming the link are selected. Obviously in the secondary switches the full 8 pairs of contacts at the crossing points will not be required. Accordingly when a connection is set up, for each crossbar switch there will be two select magnets operated before the bridge magnet is energised, namely a magnet corresponding to one of levels 1–10 and a magnet corresponding to either level 11 or level 12.

Referring now to Figs. 3, 4 and 5, these show the equipment suitable for setting up a connection to a called station SUB1 from a calling station SUB2. The calling station SUB2 is associated with the primary switch P1 so that some of the equipment for this switch is shown, while the called party SUB1 is associated with primary switch P5 and accordingly the equipment for this switch is shown. It will be understood that the switches P2—P4 have similar equipment. It will also be assumed that the connection is set up over secondary switches S1 and S5 and over the particular transmission bridge shown which might be transmission bridge TB8 as shown in Fig. 1.

The general arrangement of the system is that the switches which are to be operated and the transmission bridge and links which are to be used are determined by the magnetic drum control in consequence of the information as to the state of the system which is recorded on the drum. This will be dealt with in detail later with relation to Figs. 6–13.

The general method of operation is that the appropriate magnets and/or relays controlling the magnets are operated in series with three-electrode cold-cathode gas discharge tubes which are selectively struck by pulses transmitted from the drum to their trigger electrodes. Conveniently the arrangement is that the particular tube which is to be struck is determined by the time point in a recurring cycle at which the pulse is sent. This may readily be effected by arranging that a priming voltage is applied to the tubes in turn and that the striking impulse is applied to all the tubes. It will then cause the striking of only the tube which happens to be primed at that instant and if the priming cycle is related to the cycle of operation of the drum, and possibly controlled therefrom by a clock track, the necessary selection can be effected without difficulty.

Three selections are required in respect of the primary switches, namely the selection of the appropriate one of ten select magnets, the selection of either select magnet 11 or select magnet 12 to determine the wiper switching, and the selection of the primary switch concerned. A series of 20 tubes is also employed to effect the selection of a suitable transmission bridge and a further pair of tubes serve to select the appropriate select magnet 11 or 12 of the secondary switch to produce the second stage of wiper switching. It is not necessary to have a set of tubes for choosing the secondary switch or a set for choosing the appropriate select magnet of the desired switch since this will be determined by other means dependent on the choice of the transmission bridge and of the primary switch. Specifically, the choice of the transmission bridge fixes the two secondary switches required and the primary switch used determines the select magnet required subject to the control of the first and second choice relays FC and SC as will be more fully described subsequently. There is also no need to associate selecting equipment with the primary switches to choose the appropriate bridge magnet since this is determined by the link and as already mentioned, the bridge magnet is operated by a fifth wire included in each link in addition to the two pairs of speaking wires. The common control equipment shown in Fig. 5 also includes a number of further tubes which serve to control the selection of the appropriate use of the bridge, namely normal or reverse by relays ND and AD and also effect ringing discrimination by relay RD.

The operation is that the calling party dials the three digits representing the number of the wanted party and these are recorded in the calling party's register on the drum. A test is then made to ascertain whether the wanted party is busy or idle and at the same time tests are made by the drum equipment to find a suitable route for the call in question. If the called subscriber is busy, these other tests are not completed. If he is idle however, when these route determinations have been made, relay ST, Fig. 5, is operated in series with the tube STT in response to the application of a pulse PL6 to the trigger electrode of the tube which causes the tube to strike. Relay ST thereupon at contacts ST1 prepares a circuit for the PA and PB relays in the various primary switches, at contacts ST2 prepares a circuit for the H relays of the various transmission bridges, at contacts ST3 prepares operating circuits for relays CS, ND and AD, at contacts ST4 prepares a circuit for relay RD and at contacts ST5 prepares circuits for relays FC and SC. The determination of the primary switch depends on which of the tubes CT1—CT5 is struck by potential connected to its trigger.

Since the control equipment is arranged to deal with the setting up of only one call at a time, the arrangement is that the various testing operations take place more or less simultaneously so as to avoid the additional time which would be involved if they took place sequentially. To facilitate this method of working, it is arranged that the selecting tubes are first struck in series with a high resistance and light only dimly. When however a comparatively low resistance negative potential is subsequently applied to a tube which is burning dimly, it burns brightly and the relay comprising the low resistance is operated by the increased current. The low resistance negative potential is not sufficient to cause the striking of a tube which is not already alight.

It should be explained that the setting up of the call from the transmission bridge takes place to the called and calling parties sequentially and as a matter of convenience it is made to the called party first. Relay H in the transmission bridge TB8, Fig. 5, when operated through its associated tube TT8, at contacts H1 prepares a circuit for the SA and SB relays in the appropriate secondary switch for the calling party (assuming a normal connection with the calling party on the "top" of the bridge), at contacts H2 similarly prepares a circuit for the SA and SB relays in the appropriate secondary switch for the called party, at contacts H3 prepares a circuit for the appropriate bridge magnet in the secondary switch over which the call will be extended to the calling party and similarly at contacts H4 prepares a circuit for the bridge magnet in the secondary switch for the called party. At contacts H5 and H6 similar circuits are prepared for the calling and called parties respectively to give ringing discrimination, at contacts H7 earth is applied to the holding lead and at contacts H8 a circuit is completed for relay B.

It has already been mentioned that the transmission bridge is completely symmetrical and that either end can be used for either the calling or called party. Consequently the distinctions which have been drawn apply to the particular call under consideration in which it is assumed that the setting up is taking place in the normal direction i.e. with the calling party at the "top" and the called party at the "bottom" of the bridge as shown in Fig. 1.

Relay B on operating, at contacts B1 completes a locking circuit for itself, at contacts B2 applies a further earth to the holding lead, at contacts B3 prepares a tone and release circuit, at contacts B4 completes a circuit for relay TP in series with the right-hand high resistance winding of relay MS and at contacts B5 marks the bridge busy to the scanner by earthing the resistors R4 and R5 shown in the dotted rectangle, the junction point of which is available to the scanner. Relay MS now operates and at contacts MS1 and MS2 starts up the ringing and tone equipment but relay TP is not operated in this circuit and the circumstances in which it comes into effect are described subsequently.

When the appropriate one of the switch selecting tubes CT1—CT5 has been struck, in this case CT5, the relays 5PA and 5PB are able to energise after relay ST has been operated on the determination of a suitable route. They thereupon connect up the various select magnets and the magnet corresponding to the lighted tube of the group ST1—ST10 is then operated. Similarly either magnet SM11 or SM12 will operate under the control of one of the tubes WT1 or WT2. In the meantime relays 5SA and 5SB will have been operated from earth over contacts CS1, ND1 and H2 thereby enabling the tubes WT3 and WT4 to control secondary switch wiper selection by operating magnet SSM11 or SSM12. Moreover one of relays FC or SC will have been operated according as the connection is being completed over the first or second choice path.

Assuming that the first choice path is available so that relay FC is operated, a circuit is completed from positive over contacts FC1, contacts 5PB7 in the primary switch P5, over contacts 5SA1 in the secondary switch S5 to operate the first select magnet SSM1. It should be mentioned that the lead from contacts 5PB7 extends to all the secondary switches to permit operation of the first select magnets therein. When this magnet has operated and also the wiper switching magnet SSM11 or SSM12, a circuit is completed from earth over the multipled select magnet contacts of the switch P5 by way of the windings of relay SS in series, multipled select magnet contacts of the secondary switch S5 for the bridge magnet PBM5 of the primary switch. Owing to the high resistance of the left-hand winding of relay SS, the bridge magnet cannot operate in this circuit but the relay operates and at contacts SS1 short-circuits its high resistance winding whereupon the bridge magnet PBM5 is enabled to operate. At contacts SS2 a circuit is completed over contacts 5SB7 and H4 for the bridge magnet SBM5 of the switch S5 by way of its own contacts BMS. Both bridge magnets therefore operate and the connection is extended to the called line. Moreover relay SS at contacts SS3 changes over the connection of negative from lead S2 to lead S1, thereby indicating to the drum control equipment that connection has been made with the called party and that the necessary selection should now be made in a similar way to ensure connection to the calling party.

The operation of the primary and secondary crossbar switches has now extended the connection to the called party's line and ringing current is applied from the ringing generator lead RG through relay FC and over contacts FC6 and FC7 to the ringing return lead RR.

The drum control equipment now performs a similar set of operations in connection with the calling party whereby connection is extended over the appropriate link and primary and secondary crossbar switches to connect his line with the chosen transmission bridge. The only difference is that in this case the selection of a transmission bridge does not have to be performed, since obviously the connection must be extended to the transmission bridge from which a connection to the called party has already been set up. Moreover it will be understood that the route for extending connection to the calling party has already been selected and the existence of such a route is obviously a pre-requisite for ringing the called party. A further difference is that since the calling party in the circumstances assumed is already on the line, there is no need to apply ringing current and this is taken care of in that relay RD in the common equipment of Fig. 5 is operated. Thereupon at contacts RD1 it completes a circuit from earth over contacts 1SB6 and H5 to operate the right-hand winding of relay AA. This at contacts AA1 prevents the short-circuiting of relay B and at contacts AA2 removes the short-circuit from the left-hand winding of relay FA so that this relay then operates from earth provided at contacts B2 ant H7. Relay FA thereupon at contacts FA1 prepares a circuit for effecting the release of relay B, at contacts FA2 opens another point in the short-circuit round its left-hand winding, at contacts FA3 and FA4 opens points in the holding and initial circuits of relay TP, at contacts FA5 disconnects the ringing tone connection to the middle winding of relay AC and at contacts FA6 and FA7 disconnects the ringing circuit and completes the calling party's side of the speaking circuit. While ringing of the called party is taking place, the calling party hears ringing tone connected over contacts TP2, B3 and FC5 to the middle winding of relay AA.

When the called party replies, relay FC is operated over its right-hand winding and thereupon at contacts FC1 prepares a further circuit for releasing relay B, at contacts FC2 completes a holding circuit for itself by removing the short-circuit round its left-hand winding, at contacts FA3 and FA4 finally disconnects the winding of relay TP at the same time releasing relay MS, at contacts FC5 opens the ringing tone circuit and at contacts FC6 and FC7 disconnects the ringing equipment and switches the connection through. The connection has now been fully set up and the parties may converse.

The bridge magnets of the various crossbar switches employed are held from earth provided by contacts B2, the circuits in the case of the secondary switches extending over operated contacts BMS and also over the contacts of either the 11th or 12th level to the bridge magnet of the primary switch. During the conversation, the transmission bridge is marked busy to the drum control equipment owing to the earth applied to the bridge scanner circuit over the contacts B5.

The connection is released by the first party to hang up and assuming this is the called party, relay AC will be released and thereupon will complete a circuit over contacts AC1 and FC1 for short-circuiting relay B. After a short delay therefore, this relay releases and at contacts B2 removes the holding earth, thereby de-energising the four bridge magnets concerned and thus restoring these portions of the crossbar selectors to normal while at the same time the transmission bridge is marked idle at contacts B5.

It may be mentioned at this point and will be explained more fully subsequently that if the called party should be busy when his line is tested or if it should prove impossible to set up a connection due to all the relevant links being busy, the details of the calling and called parties are retained on the drum and continued attempts are made to set up the call until it is finally successful. As this may take an appreciable time during which the calling party may not wish to wait on the line, he may replace his receiver and in this case it will be necessary to ring him when the connection has been completed. In these circumstances relay RD is not operated and consequently ringing takes place of both the calling and called parties.

With this arrangement a situation can arise in which neither party is present to answer the telephone when a stored call matures and thus ringing of the two telephones might continue indefinitely unless some special action was taken to prevent this happening. This is the function of the relay TP shown in Fig. 5 in the transmission bridge. It has already been pointed out that when relay B operates, a circuit is completed for relays MS and TP in series but relay TP will not normally be operated owing to the high resistance of the right-hand winding of relay MS which is alone effective. In the circumstances envisaged, neither relay FA nor relay FC will be operated and after a suitable interval, which will vary dependent on the time when the connection was initiated, the so-called S pulse will become effective and through the left-hand winding of relay MS will provide a low resistance connection for the lower winding of relay TP, thus causing this relay to operate. Thereupon at contacts TP1 it locks up to the holding lead over its upper winding and at contacts TP2 disconnects the normal ringing tone lead and connects up in its place the so-called Z pulse lead which also carries ringing tone. A predetermined time after the initiating S pulse, the Z pulse becomes effective and thereupon effects operation of relays AC and AA. As a result of this operation the short-circuits are removed from the left-hand windings of relays FA and FC and these relays operate, thereby terminating the ringing. When the Z pulse ceases, relays AA and AC release and circuits are then completed for short-circuiting relay B which brings about the release of the connection in the usual manner.

Consideration will now be given to the arrangement of the magnetic drum and the various electronic relays for exercising control. The drum is of a type now well-known and is provided with a surface of magnetic material, for instance nickel, and is arranged to be rotated about its axis at a constant speed. In known manner, it carries a number of tracks, each provided with a reading and a writing head and in some cases also with an auxiliary reading head. In the present instance five subscribers' register tracks are provided, each arranged to deal with 40 subscribers and as a matter of convenience the subscribers associated with the individual primary switches are dealt with by separate tracks. In addition there is a transfer track, the cooperating reading and writing heads of which are located a distance apart equal to the length of one subscriber's register so that the information set up on the transfer track is repeated round the circumference of the drum.

Each portion of register track corresponding to one subscriber's register is divided into six blocks each of five elements. These blocks will be referred to as TY1–6 corresponding to the clock pulses which define them and the elements as TX1–5. For convenience in understanding the working of the invention, the functions of the markings of the various elements of a subscriber's register may be set out as follows:

| | | | |
|---|---|---|---|
| TY1.TX1 | Subscriber's register associated with transfer track | TY4.TX1 | Digit stored in this block |
| 2 | Spare | 2, 3, 4, 5 | Third digit |
| 3 | Spare | TY5.TX1 | Connect N.U. |
| 4 | Busy timing | 2 | Spare |
| 5 | Busy guard | 3 | Spare |
| TY2.TX1 | Digit stored in this block | 4 | Subscriber busy |
| 2, 3, 4, 5 | First digit | 5 | Spare |
| TY3.TX1 | Digit stored in this block | TY6.TX1 | Call connected |
| 2, 3, 4, 5 | Second digit | 2 | Ring back |
| | | 3 | Line condition |
| | | 4 | Add 1 |
| | | 5 | Add a second 1 |

A similar allocation for the transfer track is as follows:

| | | | |
|---|---|---|---|
| TY1.TX1, 2, 3, 4 | Spare | TY4.TX1 | Digit stored in this block |
| 5 | Hunt for address | 2, 3, 4, 5 | Third digit |
| TY2.TX1 | Digit stored in this block | TY5.TX1 | Called subscriber found |
| 2, 3, 4, 5 | First digit | 2 | Spare |
| TY3.TX1 | Digit stored in this block | 3 | Spare |
| 2, 3, 4, 5 | Second digit | 4 | Called subscriber busy |
| | | 5 | Spare |
| | | TY6.TX1 | First signal S1 from switches |
| | | 2 | Fill summation track |
| | | 3 | Calling subscriber pulsed |
| | | 4 | Calling subscriber connected |
| | | 5 | Called subscriber pulsed |

As just mentioned, use is made of a number of time pulses or so-called clock waveforms which determine the location of the various storage elements and are referred to in greater detail in specification Serial No. 300,429. Thus waveforms TX1–TX5 define the individual elements, TY1–TY6 define the blocks and TA1–TA4 define the different subscribers' registers in association with the TB waveforms of which there are ten, TB1–TB10, covering the whole circumference of the drum. Further waveforms TW1–TW5 are also employed for connecting up the different ones of the five register tracks in turn.

The search for the called number may be effected in known manner by comparing what is set up on the transfer track with a so-called address track which carries permanent information corresponding to the 200 individual subscribers' numbers. Since this would involve five address tracks however with the complication of track switching arrangements, the requirements may be met alternatively by providing an address waveform which is composed of 200 different combinations extending over a period equal to the scanning of five tracks. This waveform is generated from the various clock pulses by a suitable rectifier matrix and it will be appreciated that the waveform is exactly equivalent to what would be obtained if the various numbers were recorded on an address track and the corresponding output obtained by means of a suitable reading head.

The drum also carries a so-called summation track and a transmission bridge register track. For reasons which will appear subsequently the length of the summation track is twice as great as the length of a subscriber's register and as a matter of convenience each of the transmission bridge registers is made of the same length as the summation track though this is not strictly necessary.

The purpose of the transmission bridge registers is to give an indication of whether any particular transmission bridge is busy or idle and if it is busy, to indicate the links to which it is connected. The purpose of the summation track is to gather into a convenient compass the link busy information which is spread out over the whole circumference of the drum in the different transmission bridge registers.

The equipment also includes a group of six electronic relays forming what will be termed staticizers, one comprising three relays for the calling party and a second comprising the other three relays for the called party. These staticizers are set when sufficient information has been received to permit the setting up of the call to be initiated and they are arranged to take up any one of five different positions indicating the primary switch to which the subscriber concerned is connected.

In the following description the operation of the various electronic relays which control the working of the drum will be set out in a notation which is now well understood and which corresponds to the circuits shown in Figs. 6–13.

As a matter of convenience the equipment for controlling the operation of the drum is mounted on a number of separate panels which largely represent a particular group of functions. The first requirement is to arrange for digits dialled by a calling party representing a wanted party's number to be recorded in the portion of the subscribers' register track individual to the calling subscriber and it has already been mentioned that for the size of exchange assumed it is convenient to make use of five tracks each accommodating 40 subscribers' registers. It is assumed that the drum makes one revolution every 16⅔ ms. and it is accordingly desirable that the subscriber's line should be tested on each revolution in order to ensure that no impulses will be lost. This is on the assumption that such impulses are intended to be transmitted at the standard rate of ten per second with a break-to-make ratio of 2:1 and the usual tolerances to cover loss of adjustment of the dial. It is found however that it involves no disadvantage and effects a saving of equipment if the control of the recording of the dialled digits in their appropriate places on the subscriber's register is effected by equipment common to all five tracks. With this arrangement all the incoming impulses are originally stored temporarily in the same position and are subsequently transferred by the common equipment to the particular place which they need to occupy. This is explained in somewhat greater detail in specification Serial No. 487,948.

Figure 6:
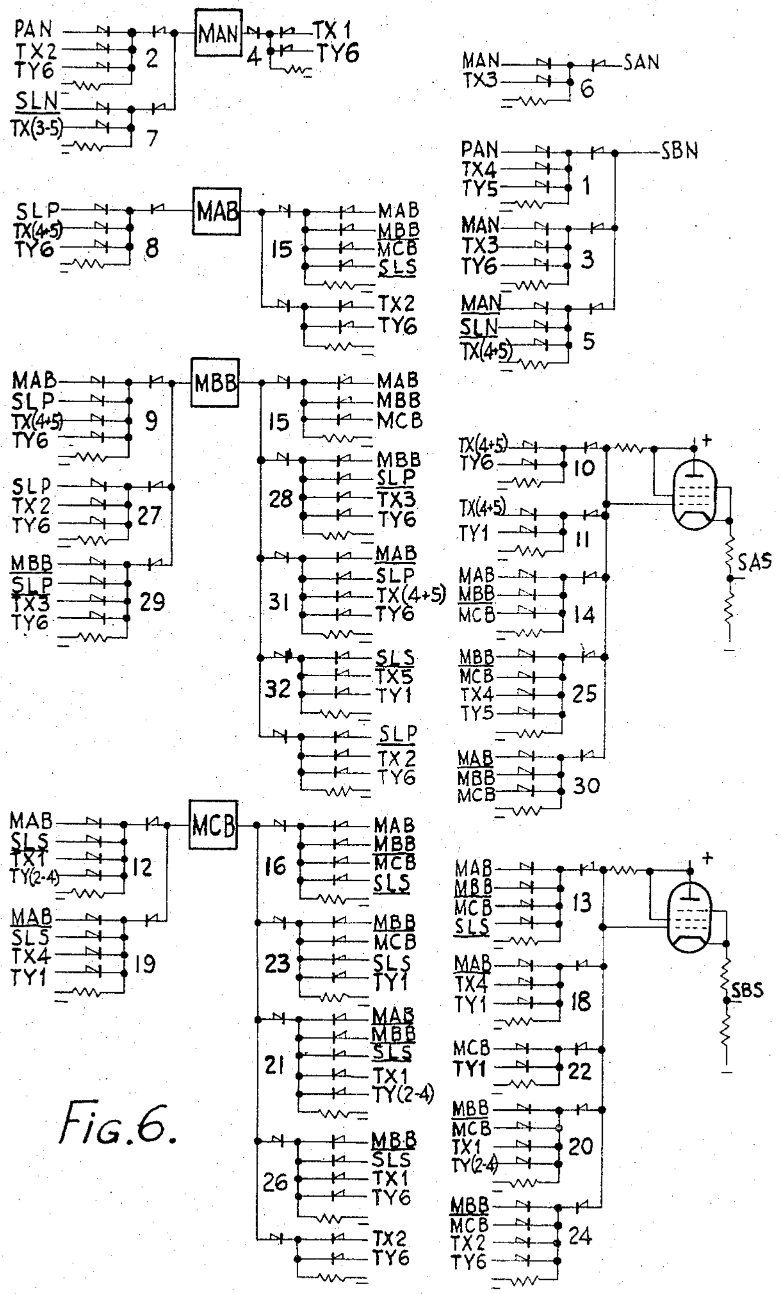
Figure 7:
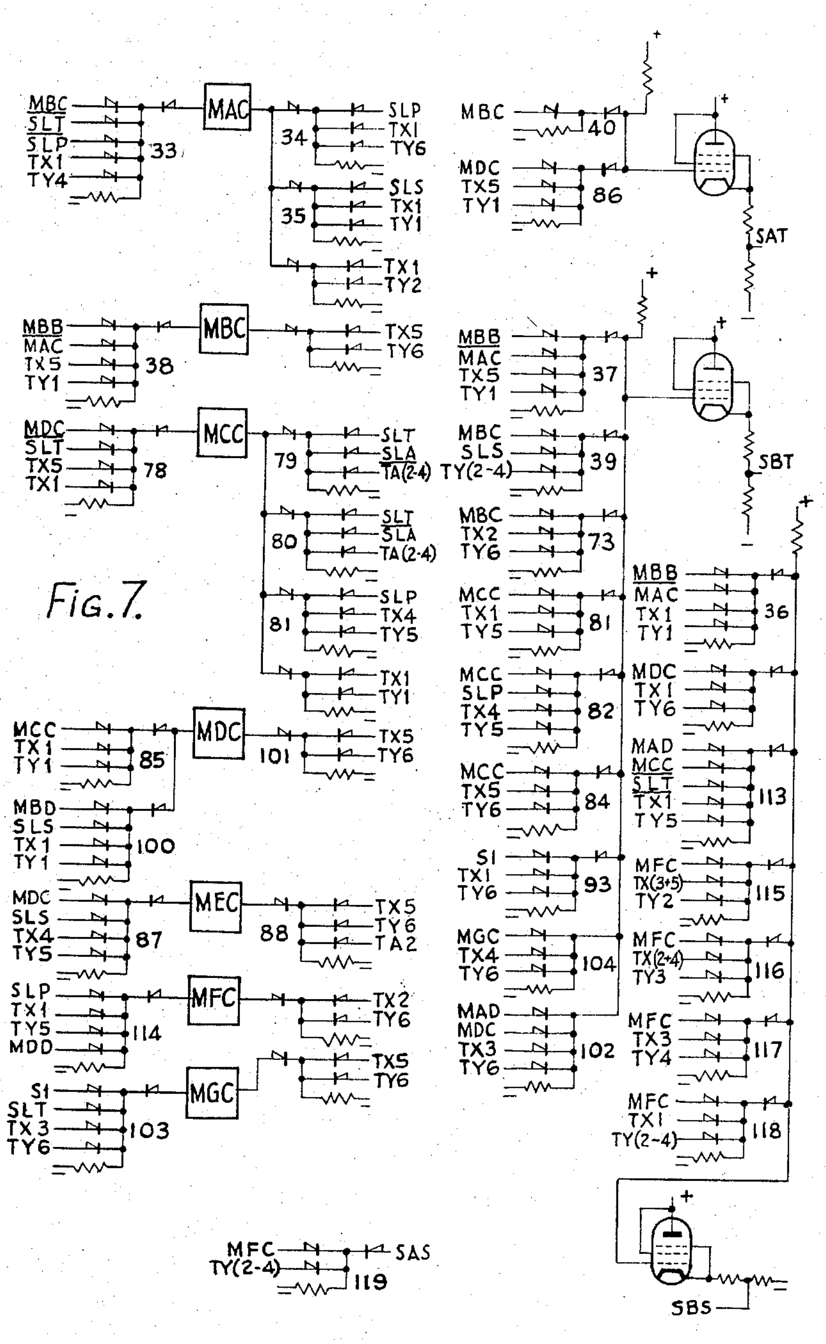
Figure 9:
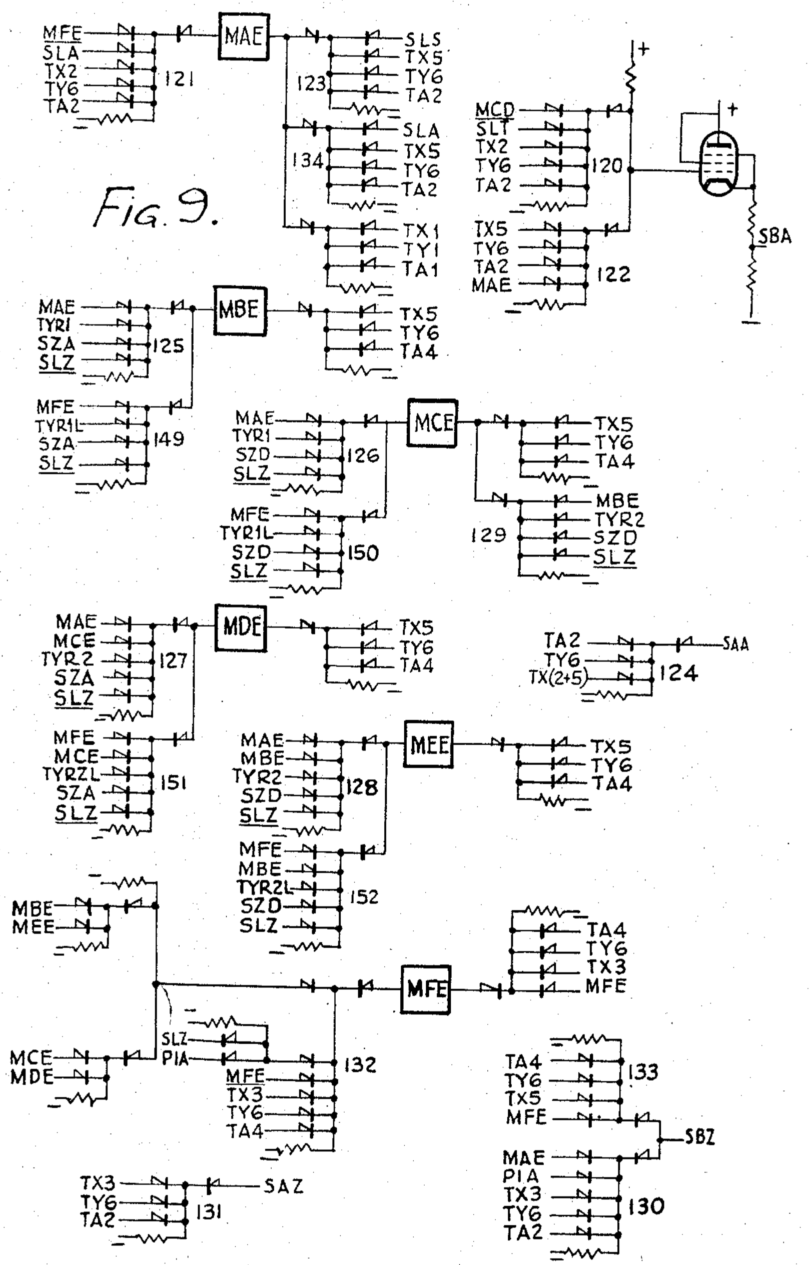
Figure 10:
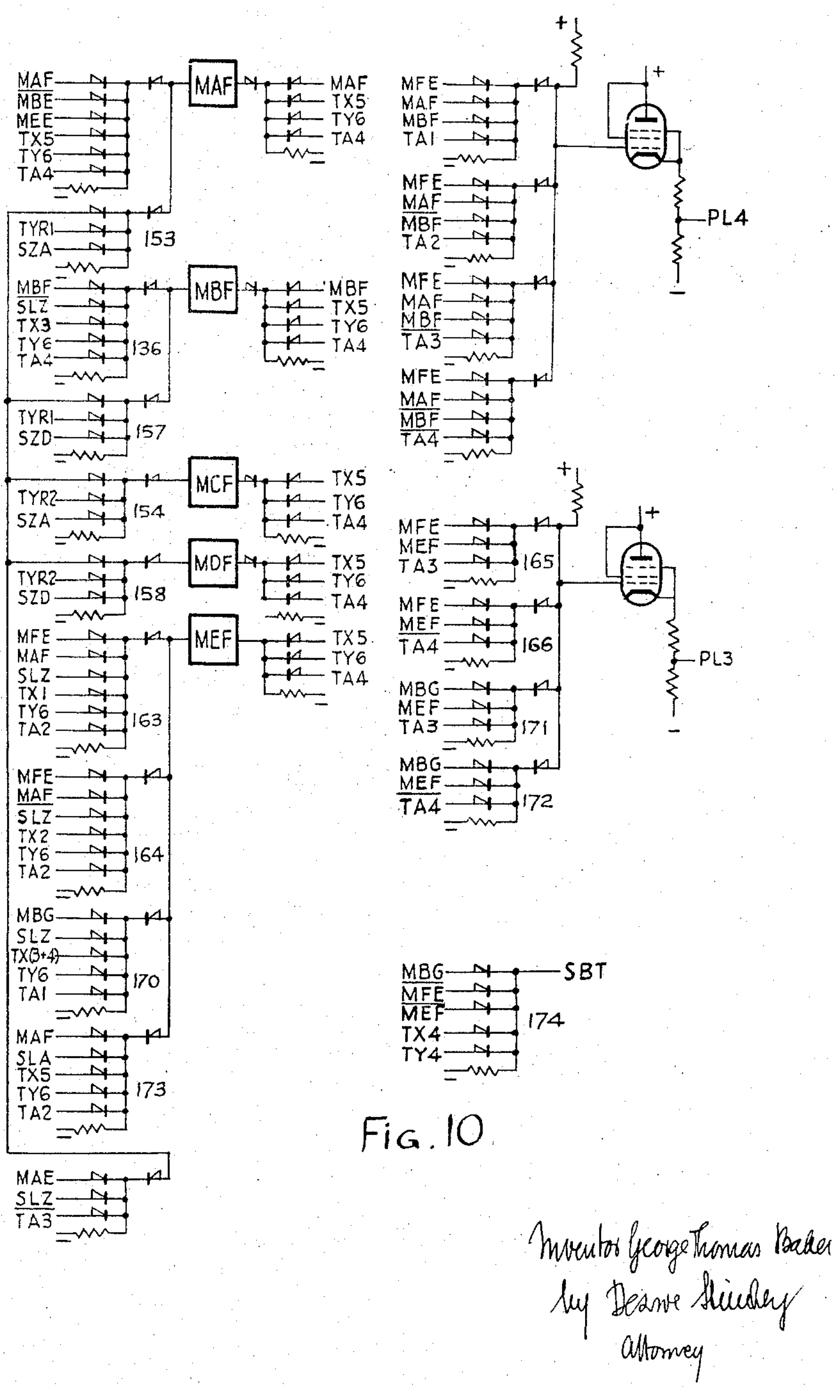
Figure 11:
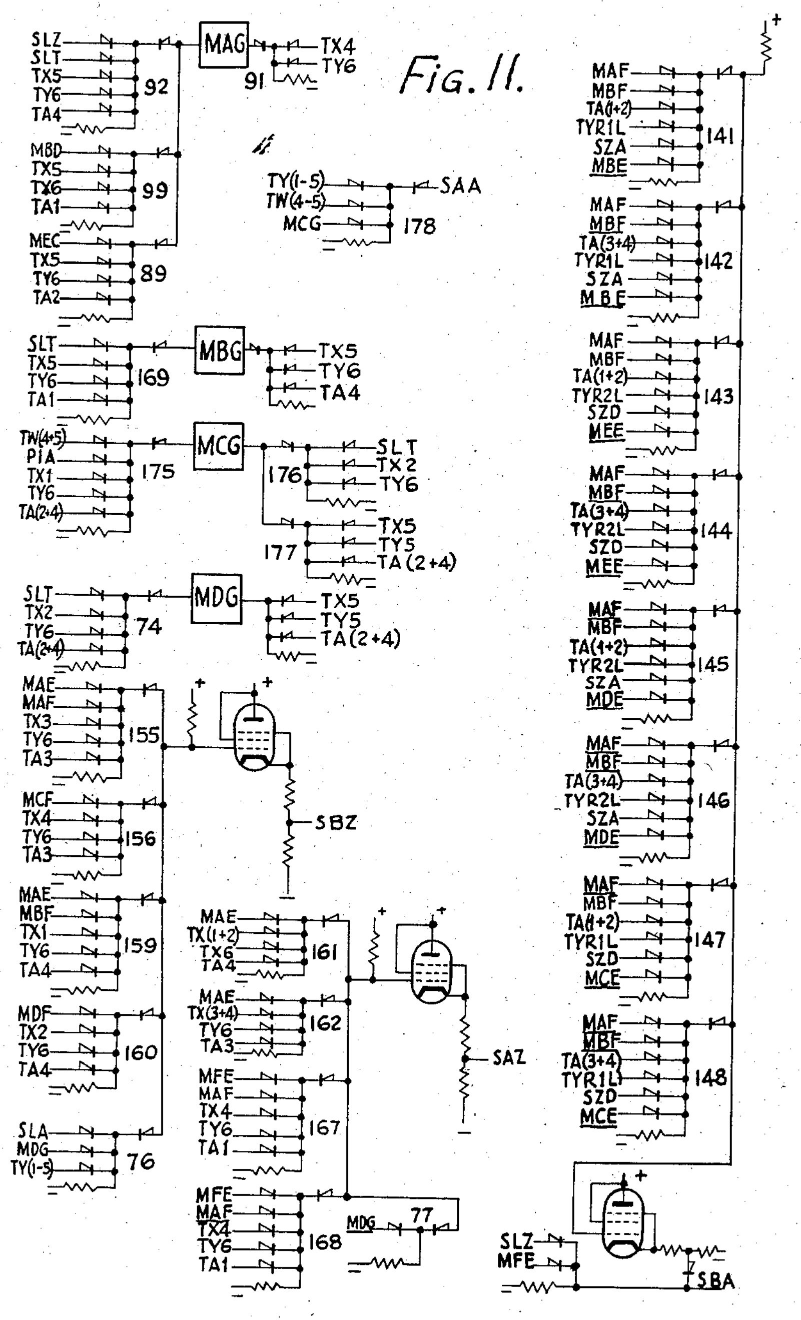
Figure 12:
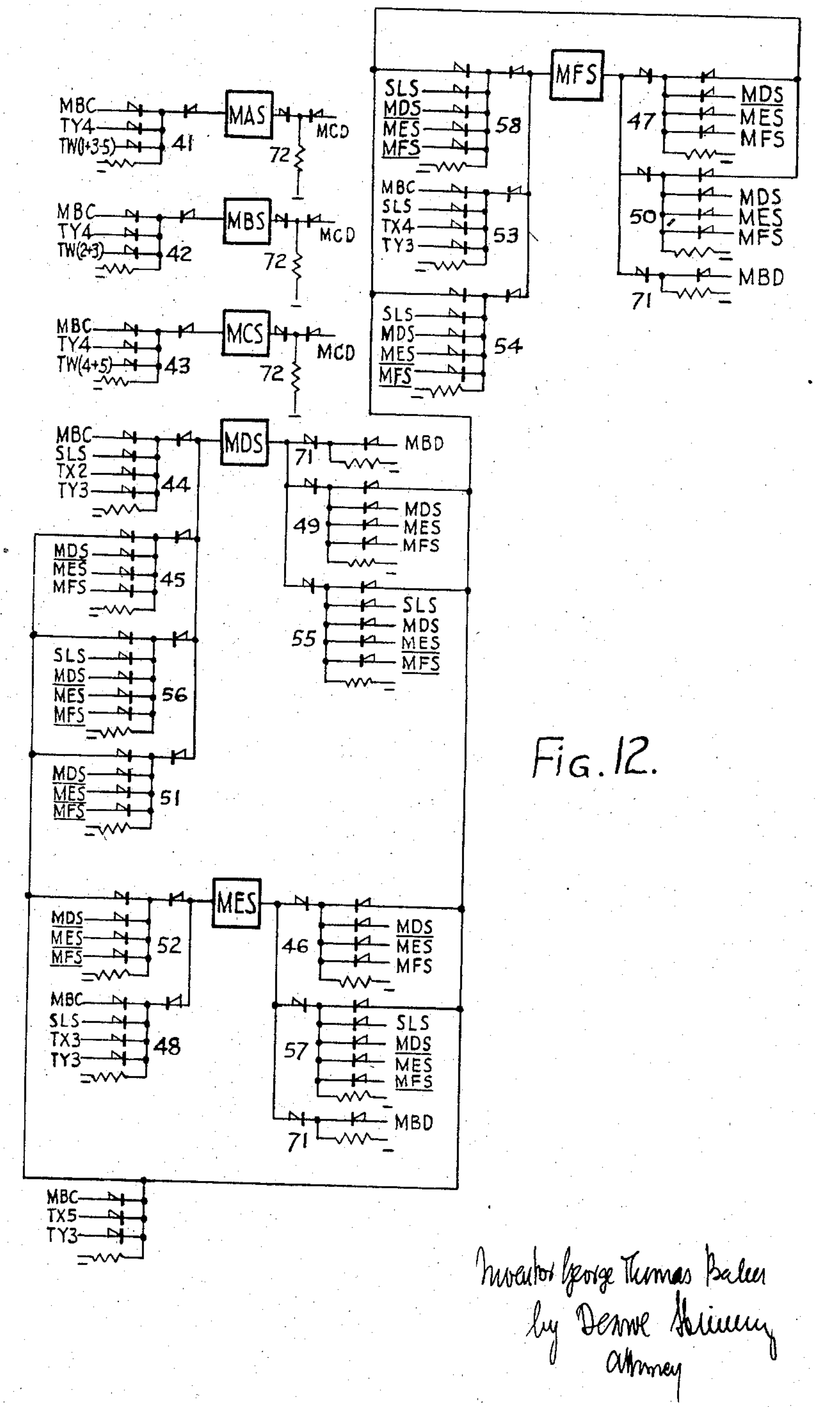
Figure 13:
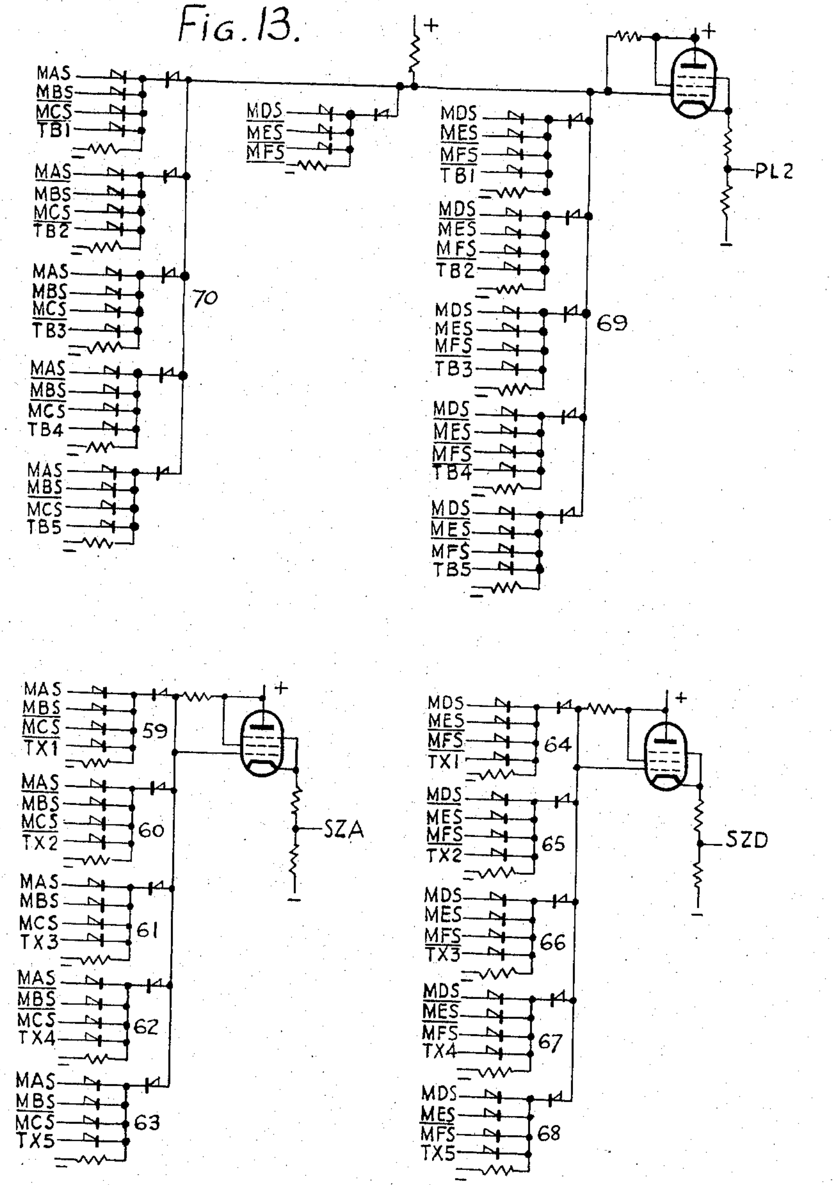

The original registration in the temporary position is controlled by the relay MAN, Fig. 6, which is individual to the particular track, while the subsequent transfer to the required position is effected by the relays MAB–MCB which are common to the five subscribers' register tracks. Numerical selection, that is to say the generation of the necessary control pulses for setting up the connection, is determined by two panels, the first comprising the relays MAC–MGC and the second comprising the relays MAD–MDD. The staticizers as already mentioned consist of a group of six relays MAS–MFS and these do not effect direct control of the drum operation. Route selection, that is to say the determination of the particular switches and links over which the connection is to be set up, is under the control of three panels comprising respectively relays MAE–MFE, MAF–MEF, and MAG–MDG.

The subscribers' lines are tested in turn by a scanning arrangement synchronised with the drum and the line connections are shown in the upper part of Fig. 3 for the subscriber SUB1. It will be seen that the called line SUB1 normally has the speaking leads connected to earth and negative battery respectively by way of the resistors R1, R2 and R3 and the test connection for the scanner is extended from the junction point of resistors R2 and R3. It will be appreciated that when the line is looped on the subscriber removing his receiver, the current flow in the line circuit causes the potential of the test point to rise and this gives an output which is obtained from the scanner and is designated PAN.

When a subscriber removes his receiver to make or answer a call, his line is marked busy by the insertion of a marking in the fourth position of the fifth block in the circuit:

$$\text{PAN.TX4.TY5–SBN} \qquad (1)$$

Shortly thereafter the relay MAN is operated in the circuit:

$$\text{PAN.TX2.TY6–MAN} \qquad (2)$$

and MAN inserts a marking in the third position of the sixth group in the circuit:

$$\text{MAN.TX3.TY6–SBN} \qquad (3)$$

MAN is reset in the circuit:

$$\text{TX1.TY6–}\underline{\text{MAN}} \qquad (4)$$

but as long as the line remains looped, the relay is immediately re-operated on each scan. When the line is again opened, no output is obtained over PAN and consequently MAN is not operated in the previous circuit and a marking is made in position TX4 of the group TY6 in the circuit:

$$\underline{\text{MAN.SLN}}\text{.TX(4+5)–SBN} \qquad (5)$$

Moreover the marking indicating the line condition is removed due to the circuit:

$$\underline{\text{MAN}}\text{.TX3–SAN} \qquad (6)$$

If the impulse represented by the marking produced by circuit (5) has not been transferred to its appropriate position by the next time the loop is opened as can occur in certain circumstances, particularly if the dial is a fast one, on the next scan after this occurs a marking is made in position TX5 also over the circuit (5) given above and MAN is operated as before.

A further operating circuit is provided for relay MAN:

$$\underline{\text{SLN}}\text{.TX(3–5)–MAN} \qquad (7)$$

and this is effective in the normal condition when the line is open and prevents an impulse marking being made as just described. Relay MAN remains operated until restored in the normal reset circuit but produces no effect.

When the common dialling equipment is next associated with that particular track, the following circuit becomes operative:

$$\text{SLP.TX(4+5).TY6–MAB} \qquad (8)$$

so that if there is a marking in position TX4, relay MAB is operated and if there is a marking in position 5 also, indicating that two impulses have been received since the last collection, relay MBB is operated in the circuit:

$$\text{MAB.SLP.TX(4+5).TY6–MBB} \qquad (9)$$

It should be mentioned that these circuits are under the control of the auxiliary reading head which is located one register length in advance of the normal reading head so as to permit certain operations to be effected which need to take place before the normal reading head comes into effect for any particular register. This is brought out in the specification just mentioned.

The impulse markings and also the busy timing and busy guard markings which will be referred to shortly are made non-regenerative by the circuits:

$$\text{TX(4+5).TY6–SAS} \qquad (10)$$
$$\text{TX(4+5).TY1–SAS} \qquad (11)$$

Assuming that there is at least one impulse to be added so that relay MAB is operated, relay MCB is operated in the circuit:

$$\text{MAB.}\underline{\text{SLS}}\text{.TX1.TY(2–4)–MCB} \qquad (12)$$

This circuit it will be appreciated is only effective if there is at least one digit space vacant in the register, that is to say, that three digits have not already been dialled. The addition of 1 to the existing registration so as to register the impulse in question is effected in the well-known manner by reversing all the registrations until a 0 has been changed to a 1 and the addition of 2 if two impulses are concerned is effected by passing over the first binary registration and subsequently reversing all registrations until a 0 has been changed to a 1.

Assuming first that there is only 1 to add so that relay MAB is operated but not relay MBB, the circuits for reversing the registrations are then:

$$\text{MAB.}\underline{\text{MBB}}\text{.MCB.}\underline{\text{SLS}}\text{–SBS} \qquad (13)$$
$$\text{MAB.}\underline{\text{MBB}}\text{.MCB–SAS} \qquad (14)$$

This process is stopped by restoring both MAB and MCB when a 0 is encountered in the circuit:

$$\text{MAB.}\underline{\text{MBB}}\text{.MCB.}\underline{\text{SLS}}\text{–}\underline{\text{MAB}} \qquad (15)$$
$$\text{–}\underline{\text{MCB}} \qquad (16)$$

If MBB is originally operated corresponding to the addition of 2, the circuits set out above cannot become operative until MBB has been restored and this is effected in the circuit:

$$\text{MAB.MBB.MCB–}\underline{\text{MBB}} \qquad (17)$$

in the first digit storage position, that is to say TX2 i.e. the position after that in which MCB was operated.

The subsequent closing of the loop it will be appreciated causes the re-operation of MAN (circuit 1) and the restoration of the line condition marking in TX3.TY6 (circuit 3) but otherwise produces no significant change. The above results are brought about on each opening however so that one unit is added to the registration. If there has been no further impulse for 83 ms. that is to say, one manipulation scan or the scanning of all five register tracks, relay MAB will not again be operated because there is no marking in TX4.TY6 indicating an impulse awaiting collection and a marking is made in the busy timing position in the circuit:

$$\underline{\text{MAB}}\text{.TX4.TY1–SBS} \qquad (18)$$

If there has still been no further impulse at the end of the next manipulation scan, that is to say, for a total of 166 ms., this is taken as indicating the end of the train of impulses, that is to say the existence of an inter-digital pause. In these circumstances the presence of the busy timing marking serves to re-operate relay MCB:

$$\underline{\text{MAB}}\text{.SLS.TX4.TY1–MCB} \qquad (19)$$

and a hunt is now made to detect the block in which the completed digit has been recorded, i.e. the first unmarked one, and busy it by the insertion of a marking in the TX1 position. This is done in the circuit:

$$\underline{\text{MBB}}\text{.MCB.TX1.TY(2–4)–SBS} \qquad (20)$$

and when this position is detected, relay MCB is reset in the circuit:

$$\underline{\text{MAB}}.\underline{\text{MBB}}.\underline{\text{SLS}}\text{.TX1.TY(2–4)–}\underline{\text{MCB}} \qquad (21)$$

and this prevents a busy marking being inserted in any subsequent blocks. It may be mentioned that the terms $\underline{\text{MAB}}$ and $\underline{\text{MBB}}$ in this circuit are required to differentiate this operation from others which take place subsequently.

Relay MCB also when operated in position TX4.TY1 (circuit 19) produces a busy guard marking in TX5.TY1 in the circuit:

$$\text{MCB.TY1–SBS} \qquad (22)$$

(the term TX5 being unnecessary as TX5 is the only position remaining). This marking, by restoring MCB in this position in the circuit:

$$\underline{\text{MBB}}\text{.MCB.SLS.TY1–}\underline{\text{MCB}} \qquad (23)$$

prevents any other digit position being busied on subsequent scans until some more impulses have been received.

The impulse trains representing the second and third digits are dealt with similarly and registered in blocks TY3 and TY4.

It will be convenient to mention at this point other operations effected by the relays on this panel. As already pointed out, the circuits ensure that if the called party is busy, repeated attempts are made to connect with his line until he becomes free, even though the calling party has hung up in the meantime. In order to ensure proper operation in these circumstances, a ring-back marking is made in the position corresponding to TX2.TY6.

When the subscriber hangs up, the opening of the loop is treated as a further impulse and thus produces a marking in TX4.TY6 (circuit 5) and hence the operation of relay MAB (circuit 8) though this is now without effect. On the next manipulation scan a marking is made in TX4.TY1 (circuit 18) and on the following manipulation scan relay MCB is operated as previously described (circuit 19). Thereupon the following circuit becomes effective for producing the ring-back marking:

$$\underline{\text{MBB}}\text{.MCB.TX2.TY6–SBS} \qquad (24)$$

It is also desirable to remove the calling subscriber's busy marking so that he may receive incoming calls and this is done slightly earlier in the circuit:

$$\underline{\text{MBB}}\text{.MCB.TX4.TY5–SAS} \qquad (25)$$

If the call has been satisfactorily completed, a marking is made in TX1.TY6 as will be explained subsequently and this then serves to reset relay MCB in the circuit:

$$\text{MBB.SLS.TX1.TY6–}\underline{\text{MCB}} \qquad (26)$$

so that in this case a ring-back marking will not be made when the subscriber hangs up.

It will be clear that since provision is made for repeatedly testing the called party's number if necessary, the record of this number must be retained in the calling party's register until the connection has been completed. As a matter of convenience it is retained throughout a successful connection and there are therefore only two situations in which cancellation is required, namely first, when the calling party hangs up after making a successful call so that ring-back has not been marked, and second, if he removes his receiver again after an unsuccessful call in which case there will have been a ring-back marking.

The cancellation operation is primarily controlled by relay MBB which is operated from the ring-back marking in the circuit:

$$\text{SLP.TX2.TY6–MBB} \qquad (27)$$

but is arranged to be reset in the circuit:

$$\text{MBB.}\underline{\text{SLP}}\text{.TX3.TY6–}\underline{\text{MBB}} \qquad (28)$$

so that this resetting takes place if the line condition indicates that the subscriber has hung up. Hence if stored call conditions exist, cancellation does not take place and the wanted number is retained to enable repeated testing. A further circuit is provided however for relay MBB:

$$\underline{\text{MBB}}.\underline{\text{SLP}}\text{.TX3.TY6–MBB} \qquad (29)$$

so that if there is no ring-back marking, which means that relay MBB has not been operated, and the line is open relay MBB is operated in the TX3.TY6 position and produces cancellation in the circuit:

$$\underline{\text{MAB}}\text{.MBB.MCB–SAS} \qquad (30)$$

During normal dialling, cancellation is prevented by the circuit:

$$\underline{\text{MAB}}\text{.SLP.TX(4+5).TY6–}\underline{\text{MBB}} \qquad (31)$$

and during the scan on which the ring-back marking is made, cancellation is prevented by the circuit:

$$\underline{\text{SLS}}\text{.TX5.TY1–}\underline{\text{MBB}} \qquad (32)$$

Consideration will now be given to the operations involved in numerical selection and from what has been said already, it will be appreciated that this involves the striking of the appropriate tubes to enable the switches to connect with the desired subscribers, first the called subscriber and then the calling subscriber. The 200 possibilities in each case are made up of the selection of one of five primary switches corresponding to the tubes CT1–CT5, Fig. 3, the selection of one of ten tubes corresponding to the tubes ST1–ST10 in Fig. 3 to effect the choice of the appropriate select magnet, and the selection of one of the two wiper switching tubes WT1 and WT2 in Fig. 3 and one of the two wiper switching tubes WT3 and WT4 in Fig. 4. The selection of the appropriate primary switch can be made directly from the staticizers of the calling and called parties and this is effected by the pulse PL2 as will subsequently appear. Selection of the other tubes is made by means of the pulse produced from the operation of relay MDC in conjunction with a prime from the appropriate clock pulse so that the tube which is primed at the time the MDC pulse is received is struck.

The clock pulses concerned are those designated TA and TB and since ten TB pulses correspond to one revolution of the drum and four TA pulses correspond to one TB pulse, it will follow that the duration of the TA pulses is equal to the time for the scanning of one subscriber's register.

Numerical selection and route selection commence as soon as the full three digits have been dialled, at which time there will be a busy marking in the TX1 position of the third digit, that is to say TX1.TY4. If the transfer track is not already in use for the completion of some other connection, it will have no marking in TX1.TY4 and a circuit is completed for operating relay MAC:

$$\underline{MBC}.\underline{SLT}.SLP.TX1.TY4\text{–}MAC \qquad (33)$$

The presence of the term $\underline{MBC}$ in this circuit is necessary to prevent false operation in the case of two subscribers with adjacent registers completing dialling simultaneously. It will be appreciated that when the call has actually been completed, since the information is retained in the subscriber's register, the circuit just mentioned would be completed if the transfer track were free. In this case however there is a marking in TX1.TY6 indicating "call connected" and relay MAC is reset in the circuit:

$$SLP.TX1.TY6\text{–}\underline{MAC} \qquad (34)$$

Moreover the actual operation of the various relays and magnets of the crossbar switches may take longer than one scan and during subsequent scans also therefore relay MAC will need to be reset, this time in the circuit:

$$SLS.TX1.TY1\text{–}\underline{MAC} \qquad (35)$$

This is due to the marking in TX1.TY1 identifying the subscriber's register using the transfer track which is produced in the circuit:

$$\underline{MBB}.MAC.TX1.TY1\text{–}SBS \qquad (36)$$

If relay MAC is still operated in the TX5.TY1 position however, it produces a marking indicating "hunt for address" on the transfer track in the circuit:

$$\underline{MBB}.MAC.TX5.TY1\text{–}SBT \qquad (37)$$

and also operates relay MBC in the circuit:

$$\underline{MBB}.MAC.TX5.TY1\text{–}MBC \qquad (38)$$

MBC then effects the transfer of the registered digits to the transfer track in the usual manner by completing the circuits:

$$MBC.SLS.TY(2\text{–}4)\text{–}SBT \qquad (39)$$

$$MBC\text{–}SAT \qquad (40)$$

It may be mentioned that the presence of the term $\underline{MBB}$ in the three circuits (36–38) just mentioned is necessary in order to cover the case where a subscriber dials two digits and then hangs up. If this term were not included, transfer to the transfer track and clearing of the subscriber's register would take place on the same scan.

The operation of MBC, in addition to causing transfer to the transfer track, also sets the staticizers for the calling and called subscribers. The calling subscriber's staticizer may be set directly from the TW pulses which determine which of the five subscribers' register tracks is being scanned. As previously pointed out, subscribers connected to a particular primary switch have their registers on the same track so that the appropriate TW pulse can be used for setting the calling party's staticizer. The appropriate circuits are:

$$MBC.TY4.TW(1+3+5)\text{–}MAS \qquad (41)$$

$$MBC.TY4.TW(2+3)\text{–}MBS \qquad (42)$$

$$MBC.TY4.TW(4+5)\text{–}MCS \qquad (43)$$

The called subscriber's staticizer is set by reference to the second digit of the dialled number and this is somewhat more complicated since the first primary switch caters for subscribers' second digits 1 and 6, the second primary switch caters for second digits 2 and 7 and so on. The circuits concerned for producing the desired effect are:

$$MBC.SLS.TX2.TY3\text{–}MDS \qquad (44)$$

$$MBC.TX5.TY3.\underline{MDS}.MES.MFS\text{–}MDS \qquad (45)$$

$$\text{–}\underline{MES} \qquad (46)$$

$$\text{–}\underline{MFS} \qquad (47)$$

resulting in the operation of MDS for second digits 1 and 6 corresponding to the first primary switch; and:

$$MBC.SLS.TX3.TY3\text{–}MES \qquad (48)$$

$$MBC.TX5.TY3.MDS.MES.MFS\text{–}\underline{MDS} \qquad (49)$$

$$\text{–}\underline{MFS} \qquad (50)$$

resulting in the operation of relay MES for second digits 2 and 7. Similarly for digits 3 and 8, which require the operation of relays MDS and MES, the circuits are the two previously mentioned (44 and 48) for effecting the straightforward operation of relays MDS and MES corresponding to digit 3 and also:

$$MBC.TX5.TY3.MDS.MES.MFS\text{–}MDS \qquad (51)$$

$$\text{–}MES \qquad (52)$$

corresponding to digit 8. For the second digits 4 and 9, relay MFS is operated and this is effected in the circuits:

$$MBC.SLS.TX4.TY3\text{–}MFS \qquad (53)$$

$$MBC.TX5.TY3.SLS.MDS.\underline{MES}.\underline{MFS}\text{–}MFS \qquad (54)$$

$$\text{–}\underline{MDS} \qquad (55)$$

For second digits 5 and 0 which correspond to the operation of relays MDS and MFS, the circuits already mentioned (44 and 53) for operating these relays suffice for the digit 5 while for the digit 0 the following circuits are also necessary:

$$MBC.TX5.TY3.SLS.\underline{MDS}.MES.\underline{MFS}\text{–}MDS \qquad (56)$$

$$\text{–}\underline{MES} \qquad (57)$$

$$\text{–}MFS \qquad (58)$$

In order to produce the desired effect subsequently, the outputs from the staticizers are combined with the different TX waveforms and the output as regards the calling subscriber will be referred to as SZA. The waveforms concerned are then as follows:

$$\text{(Switch P1)}\ MAS.\underline{MBS}.\underline{MCS}.TX1\text{–}SZA \qquad (59)$$

$$\text{(Switch P2)}\ \underline{MAS}.MBS.\underline{MCS}.TX2\text{–}SZA \qquad (60)$$

$$\text{(Switch P3)}\ MAS.MBS.\underline{MCS}.TX3\text{–}SZA \qquad (61)$$

$$\text{(Switch P4)}\ \underline{MAS}.\underline{MBS}.MCS.TX4\text{–}SZA \qquad (62)$$

$$\text{(Switch P5)}\ MAS.\underline{MBS}.MCS.TX5\text{–}SZA \qquad (63)$$

while for the called party the corresponding outputs SZD are similar, namely:

$$\text{(Switch P1)}\ MDS.\underline{MES}.\underline{MFS}.TX1\text{–}SZD \qquad (64)$$

$$\text{(Switch P2)}\ \underline{MDS}.MES.\underline{MFS}.TX2\text{–}SZD \qquad (65)$$

$$\text{(Switch P3)}\ MDS.MES.\underline{MFS}.TX3\text{–}SZD \qquad (66)$$

$$\text{(Switch P4)}\ \underline{MDS}.\underline{MES}.MFS.TX4\text{–}SZD \qquad (67)$$

$$\text{(Switch P5)}\ MDS.\underline{MES}.MFS.TX5\text{–}SZD \qquad (68)$$

again corresponding to the different primary switches.

It has already been pointed out that the operation of the appropriate switch selecting tubes CT1–CT5 is effected by a pulse PL2 which is dependent upon coincidence with a particular one of the TB pulses. It will accordingly be appreciated that in view of the setting of the called subscriber's staticizer, the pulse for selecting the switch to connect with his line may be defined as follows:

$$\text{MDS}.\underline{\text{MES}}.\underline{\text{MFS}}.\text{TB1}+\underline{\text{MDS}}.\text{MES}.\underline{\text{MFS}}.\text{TB2}+\text{MDS}.\text{MES}.\underline{\text{MFS}}.\text{TB3}+\underline{\text{MDS}}.\underline{\text{MES}}.\text{MFS}.\text{TB4}+\text{MDS}.\underline{\text{MES}}.\text{MFS}.\text{TB5}–\text{PL2} \quad (69)$$

The waveform represented by the pulse PL2 must also include a portion for operating the necessary switch selection tube for the calling subscriber but this information requires to be suppressed initially while the called subscriber's switch is being dealt with. This further portion for the calling subscriber is similar namely:

$$\text{MAS}.\underline{\text{MBS}}.\underline{\text{MCS}}.\text{TB1}+\underline{\text{MAS}}.\text{MBS}.\underline{\text{MCS}}.\text{TB2}+\text{MAS}.\text{MBS}.\underline{\text{MCS}}.\text{TB3}+\underline{\text{MAS}}.\underline{\text{MBS}}.\text{MCS}.\text{TB4}+\text{MAS}.\underline{\text{MBS}}.\underline{\text{MCS}}.\text{TB5}–\text{PL2} \quad (70)$$

but the whole of this expression is subject to the further coincidence $\underline{\text{MDS}}.\underline{\text{MES}}.\underline{\text{MFS}}$ so that it is ineffective as long as the called subscriber's staticizer is still set which means that at least one of the component relays is operated. It may also be pointed out that the called subscriber's staticizer is set slightly earlier than the calling subscriber's, namely in the TY3 position as against the TY4 position. When the called subscriber has been connected with however, his staticizer is reset by the operation of relay MBD as will be shortly described in the circuit:

$$\text{MBD}–\underline{\text{MDS}}+\underline{\text{MES}}+\underline{\text{MFS}} \quad (71)$$

When connection has subsequently been made to the calling party, his staticizer is restored to normal and this is effected by the operation of relay MCD in the circuit:

$$\text{MCD}–\underline{\text{MAS}}+\underline{\text{MBS}}+\underline{\text{MCS}} \quad (72)$$

Reverting now to the operation of relay MBC which effects transfer of the dialled digits to the transfer track and causes the setting of the staticizers, this also initiates the operation of filling the summation track to indicate which of the various links are busy. The marking which brings this about is in position TX2.TY6 on the transfer track and this is inserted in the circuit:

$$\text{MBC.TX2.TY6–SBT} \quad (73)$$

This marking is subsequently effective to operate the relay MDG which has been described as located on the third route selection panel. The circuit concerned is:

$$\text{SLT.TX2.TY6.TA(2+4)–MDG} \quad (74)$$

and this relay is subsequently reset in the circuit:

$$\text{TX5.TY5.TA(2+4)—}\underline{\text{MDG}} \quad (75)$$

which ensures that it shall remain operated for about 2 TA's which is the length of a transmission bridge register.

The allocations of the different elements for a transmission bridge register may be set out by way of example for the first transmission bridge register 12 as follows:

| | | |
|---|---|---|
| TA1.TY1.TX1, 2, 3, 4, 5 | 5 first choice links terminating on secondary switch 1 and originating on primary switch. | PS1, PS2, PS3, PS4, PS5 |
| TY2.TX1, 2, 3, 4, 5 | 5 first choice links terminating on secondary switch 2 and originating on primary switch. | PS1, PS2, PS3, PS4, PS5 |
| TY(3-6) | Spare | |
| TA2.TY1.TX1, 2, 3, 4, 5 | 5 second choice links terminating on secondary switch 1 and originating on primary switch. | PS1, PS2, PS3, PS4, PS5 |
| TY2.TX1, 2, 3, 4, 5 | 5 second choice links terminating on secondary switch 2 and originating on primary switch. | PS1, PS2, PS3, PS4, PS5 |
| TY(3-5) | Spare | |
| TY6.TX1 | Spare | |
| 2 | Information collected from next bridge | |
| 3 | Spare | |
| 4 | Spare | |
| 5 | Bridge test start | |

The other one of the pair 12 is the same except that it is in TA3 and TA4 instead of TA1 and TA2. For bridges 13 the allocation will be similar except that TY2 is spare and TY3 contains the markings for the links terminating on secondary switch 3. The allocations for the other bridges follow the same principle.

For the summation track the allocation is somewhat similar and the details are as follows:

| | |
|---|---|
| TA(1+3).TY(1-5).TX(1-5) | 25 first choice links |
| TY6.TX1 | Spare |
| TX2 | Spare |
| TX3 | Calling subscriber first choice link if straight. |
| TX4 | Calling subscriber first choice link if reverse. |
| TX5 | Spare |
| TA(2+4).TY(1-5).TX(1-5) | 25 second choice links |
| TY6.TX1 | Called subscriber first choice link if straight |
| TX2 | Called subscriber first choice link if reverse |
| TX3 | First bridge free |
| TX4 | Spare |
| TX5 | Bridge found |

Each time relay MDG is operated, which takes place in turn for all the various transmission bridge registers, the information obtained therefrom indicating the condition of the various links and represented by the output SLA is written into the summation track in the circuit:

$$\text{SLA.MDG.TY(1–5)–SBZ} \quad (76)$$

This information in fact is written in repeatedly as long as the marking in TX2.TY6 of the transfer track persists and this marking is only removed when the connection has been fully set up and the transfer track is cleared entirely. Thereupon there is no further circuit for relay MDG and the summation track also is cleared in the circuit:

$$\underline{\text{MDG}}–\text{SAZ} \quad (77)$$

Returning now to the operation which takes place in connection with the digits written into the transfer track, a hunt is now made for the called subscriber's register and this is effected by comparing the digits registered on the transfer track with what could be the output from an address track but in this particular case is more conveniently a special address waveform as previously explained, this waveform being denoted by SLAD with inverse $\underline{\text{SLAD}}$. Relay MCC is now operated by the "hunt for address" marking in TX5.TY1 on the transfer track, the circuit being:

$$\underline{\text{MDC}}.\text{SLT.TX5.TY1–MCC} \quad (78)$$

MCC is continually reset as long as there is a difference between the number registered on the transfer track and the appropriate number in the address waveform in the circuits:

$$\text{SLT}.\underline{\text{SLAD}}.\text{TY(2–4)–}\underline{\text{MCC}} \quad (79)$$

$$\underline{\text{SLT}}.\underline{\text{SLAD}}.\text{TY(2–4)–}\underline{\text{MCC}} \quad (80)$$

When correspondence is found, relay MCC remains operated until the beginning of the TY5 block and by means of the circuit:

MCC.TX1.TY5–SBT (81)

inserts a marking on the transfer track to indicate that the called subscriber has been found. A test is also made over the auxiliary reading head for the busy or idle condition of the called subscriber and if he is busy as indicated by a marking in TX4.TY5 of his register, a marking is inserted in the same position on the transfer track in the circuit:

MCC.SLP.TX4.TY5–SBT (82)

Moreover relay MCC is reset in the circuit:

SLP.TX4.TY5–$\underline{\text{MCC}}$ (83)

and the various further operations for setting up the connection do not take place.

If the subscriber is free however, relay MCC remains operated and a marking is made on the transfer track in TX5.TY6 in the circuit:

MCC.TX5.TY6–SBT (84)

to indicate "called subscriber pulsed" and immediately thereafter, relay MDC is operated in the circuit:

MCC.TX1.TY1–MDC (85)

and as previously mentioned causes the operation of the appropriate tubes for setting up the connection. Relay MDC also by the circuit:

MDC.TX5.TY1–SAT (86)

removes the marking indicating "hunt for address" and by the circuit:

MDC.SLS.TX4.TY5–MEC (87)

controls the ring discriminator tube and the associated relay RD. As regards the called subscriber who is for the moment being considered, he is not on the line and hence there is no marking in the TX4.TY5 position of his register. Relay MEC and relay RD, Fig. 5, cannot therefore be operated and thus ringing takes place. Relay MEC, if operated, is subsequently reset in the circuit:

TX5.TY6.TA2–$\underline{\text{MEC}}$ (88)

Relay MEC when operated completes the following circuit for relay MAG:

MEC.TX5.TY6.TA2–MAG (89)

and relay MAG produces the pulse PL6 for operating the RD tube:

MAG–PL6 (90)

Relay MAG is reset in the circuit:

TX4.TY6–$\underline{\text{MAG}}$ (91)

so that it remains operated for about one TA interval, namely TA3.

Relay MAG is also operated, either before or after the above operation due to the selection of a free route as will be described shortly, the circuit in this case being:

SLZ.SLT.TX5.TY6.TA4–MAG (92)

and MAG again produces a pulse PL6, on this occasion in TA1 so that it serves to strike the tube associated with relay ST and thus permit the operated selecting tubes to become effective for setting the crossbar switches. The reset circuit is as before.

When the crossbar switch select magnets have operated to close their contacts SMS, which may involve the time of more than one scan, relay SS, Fig. 4, applies earth at contacts SS3 to the lead S1 and the circuit:

S1.TX1.TY6–SBT (93)

causes a corresponding marking to be made on the transfer track to indicate the progress of the call.

Considering now the operation of the equipment on the second numerical selection panel which controls the further operations, the relay MAD is operated repeatedly as long as the calling party is associated with the transfer track:

SLS.TX1.TY1–MAD (94)

in view of the marking in this position. Relay MAD is reset on each occasion in the circuit:

TX5.TY6–$\underline{\text{MAD}}$ (95)

When the crossbar switches have operated to complete the connection to the called line, relay SS is short-circuited by earth on the hold lead and the second signal S2 from the equipment of Figs. 3–5 is produced by the restoration of contacts SS3. Thereupon, the following circuit is completed for relay MBD:

S2.MAD.SLT.TX1.TY6–MBD (96)

and relay MBD serves to operate the A extinguishing circuit which opens the anode circuits of the wiper switching tubes, the primary switch selecting tubes and the select magnet tubes together with those associated with relays RD, FC and SC.

The select magnets now de-energise and also the operated PA and PB relays. Relay MBD is subsequently reset in the circuit:

SLS.TX1.TY1–$\underline{\text{MBD}}$ (97)

dependent on the calling subscriber's marking and thus remains operated for one manipulation scan so as to ensure satisfactory extinction of the various tubes.

In order to prevent more than one clearing operation, the initiating marking in TX1.TY6 of the transfer track is now removed:

MBD.TX1.TY6–SAT (98)

Relay MBD also produces the operation of relay CS by striking its associated tube and relay CS effects the necessary changeover of contacts CS1 in Fig. 5 to condition the circuits for connecting with the calling party. This is effected by relay MAG which is now operated in the circuit:

MBD.TX5.TY6.TA1–MAG (99)

and as a consequence a pulse PL6 is again sent out, this time during TA2 so as to operate the CS tube. Tube CS strikes and operates relay CS in series therewith so that at contacts CS1, Fig. 5, the control circuits are switched over as required.

At the same time as relay MBD is reset, a circuit is completed for relay MDC:

MBD.SLS.TX1.TY1–MDC (100)

and MDC as before provides the pulse for operating the desired selecting tubes. It will be noted however that in this case the operation of relay MDC is produced by the marking in the calling subscriber's register. Relay MDC is reset in the circuit:

TX5.TY6–$\underline{\text{MDC}}$ (101)

A circuit is now completed for marking "calling subscriber pulsed" on the transfer track:

MAD.MDC.TX3.TY6–SBT (102)

and when the signal S1 is again received indicating that the select magnets have operated, relay MGC is set in the circuit:

S1.SLT.TX3.TY6–MGC (103)

and this then marks the transfer track "calling subscriber connected":

MGC.TX4.TY6–SBT (104)

When the establishment of the connection is completed, the signal S2 is again received on the de-energisation of relay SS, Fig. 5, and the following circuit then becomes operative:

MAD.S2.SLT.TX4.TY6–MCD (105)

This produces the so-called B extinguishing pulse and in view of the circuit:

MCD–MBD (106)

the A extinguishing circuit is also operative so that all the tubes are extinguished. After one further manipulation scan, relay MDD is operated in the circuit:

MCD.SLS.TX1.TY1–MDD (107)

and this serves to clear the transfer track:

MDD–SAT (108)

and relay MDD is reset in the circuit:

TX5.TY6–$\underline{\text{MDD}}$ (109)

By means of the circuit:

MCD.TX1.TY1–SAS (110)

the dot indicating the calling subscriber's association with the transfer track is removed and at the same time relay MCD is reset in the circuit:

SLS.TX1.TY1–$\underline{\text{MCD}}$ (111)

Relay MCD is also operated if the called subscriber is busy in the circuit:

MAD.SLT.TX4.TY5–MCD (112)

due to the corresponding marking on the transfer track and this results in the extinguishing of all the tubes and the clearance of the transfer track by the circuits just described. It will be appreciated however that the registration in the calling subscriber's register is not removed and that if no other callers are awaiting attention, the transfer track is again appropriated for the calling subscriber in question and testing is repeated, subject to other parties' requirements, until the called party becomes free. As already pointed out, this testing operation takes place even if the calling party hangs up in the meantime and if this happens, he is rung when the call finally matures. If however he again removes his receiver before the stored call has been dealt with, all the registrations are removed by $\underline{\text{MAB}}$.MBB.MCB (circuit 30) and he is free to make another call.

A further condition can conveniently be dealt with at this point. It is unlikely that the full capacity of the exchange will ever be connected and there is therefore the danger that a calling party may dial a number which is not in use. In these circumstances it is desirable that he should be given a definite indication of what has taken place and obviously the registration should not be retained. The criterion for an unused number is that the hunt for the address shall have been completed over the full 200 numbers without coincidence being established. This obviously depends upon the fact that unused numbers are not included in the address waveform. If such an unsuccessful hunt takes place, the following circuit is completed for marking "connect NU tone" on the calling subscriber's register:

MAD.$\underline{\text{MCC}}$.$\underline{\text{SLT}}$.TX1.TY5–SBS (113)

and the same circuit is also operative to energise relay MCD which thereupon extinguishes all the tubes and clears the transfer track. The marking which has just been made now brings about the operation of relay MFC:

SLP.TX1.TY5.MCD–MFC (114)

the effect of which is to cancel the dialled number and write in instead the particular spare number which is used for the transmission of NU tone. It will be assumed that this number is 052 and this is written into the three digit blocks of the subscriber's register in the circuits:

MFC.TX(3+5).TY2–SBS (115)

MFC.TX(2+4).TY3–SBS (116)

MFC.TX3.TY4–SBS (117)

and the appropriate busy dots are inserted by the circuit:

MFC.TX1.TY(2–4)–SBS (118)

while the dialed number is erased by the circuit:

MFC.TY(2–4)–SAS (119)

Operation now takes place in the usual manner to set up a connection from the calling party to number 052 from which he receives busy tone. It is considered to be satisfactory to use only a single number for this purpose though if this number were busy because NU tone was being transmitted to some other party, connection could not be made therewith until it was cleared. Repeated tests would take place however in the usual way and in view of the comparatively rare occasions on which NU is likely to be required and of the probable short holding time, this arrangement is felt to be satisfactory in practice. Obviously if a subscriber should dial 052 he would receive NU tone in any event.

Consideration will now be given to the details of the manner in which the route is selected for any particular connection. As has been pointed out already, with the trunking arrangement illustrated in Fig. 1, it is possible for any connection to be set up over any pair of secondary switches provided no other calls are in progress at the time but obviously the connection must involve the primary switches to which the calling and called subscribers are connected and all links are not equally available. It is possible moreover for any one of the 20 transmission bridges to be employed provided it is not already in use. Though certain of these bridges have been illustrated diagrammatically in Fig. 1 and have been given the references TB1–12, it may be more convenient in considering their place in the trunking circuit to think of them in terms of the secondary switches to which they are connected. Thus a bridge between secondary switches 1 and 2 may be called 12 and similarly one between secondary switches 1 and 3 may be called 13. Using this notation, the twenty bridges would be represented as 12, 12, 13, 13, 14, 14, 15, 15, 23, 23, 24, 24, 25, 25, 34, 34, 35, 35, 45, 45. From the routing point of view, two bridges with the same number are clearly equivalent so that a first and second choice is always available over the bridges of the same significance.

The various bridges are provided with individual registers in a track and though the number of links with which any bridge can be associated is a maximum of 20, it is convenient to make the transmission bridge registers equal to the length of the summation track which has been chosen to be 60 elements, namely 50 corresponding to the various links and 10 available for control purposes. Since 5 elements constitute a block (TY) and for the subscribers' registers there are 6 blocks, the length of a transmission bridge register and also of the summation track will be 12 blocks which with the notation previously described corresponds to the length of two TA pulses. Four TA's correspond to one TB and consequently the registers of two equivalent transmission bridges, e.g. 12, 12 can be accommodated in the space corresponding to one TB. Moreover since there are 20 transmission bridges, 10 TB's will accommodate them all and this represents the full circumference of the track. Conveniently the relationship is in the order suggested above, that is to say bridges 12, 12 correspond to TB1; 13, 13 to TB2 and so on. The first bridge of the pair corresponds to TA1+TA2 and the second to TA3+TA4. The information as to the busy or idle condition of the links which is contained in a transmission bridge register is stored in the first five blocks. There are two links between any primary switch and any secondary switch, one regarded as the first choice and the other as the second choice. First choice links are dealt with in the first TA position of any bridge register (TA1 or TA3) and second choice links in the second TA position (TA2 or TA4).

These links have their corresponding markings in block TY1 if they terminate in secondary switch 1 and TY2 if they terminate in secondary switch 2 and so on and this determines the constitution of the so-called TYR waveforms. The convention adopted is that TYR1 denotes the position of the links accessible to the "top" of the bridge and TYR2 the links accessible to the "bottom," e.g. for bridge 45 TYR1 would be TY4 and TYR2 would be TY5. The allocation of the various elements in the transmission bridge register has already been explained in connection with the filling of the summation track.

The TYR waveforms are produced from a clock in a manner very similar to that used to produce the address waveform. Since the bridge test has to be made one unit in advance $$TYR1=TY1.TB(10+1+2+3)+TY2.TB(4+5+6)+TY3.TB(7+8)+TY4.TB9$$

and $$TYR2=TY2.TB10+TY3.TB(1+4)+TY4.TB(2+5+7)+TY5.TB(3+6+8+9)$$

These waveforms serve for the testing process but as will become apparent, a similar waveform is used one TB later for marking busy links on a bridge register and these waveforms are referred to as TYR1L and TYR2L. Accordingly $$TYR1L=TY1.TB(1+2+3+4)+TY2.TB(5+6+7)+TY3.TB(8+9)+TY4.TB10$$

and $$TYR2L=TY2.TB1+TY3.TB(2+5)+TY4.TB(3+6+8)+TY5.TB(4+7+9+10)$$

In a given TY, the links are arranged so that marking takes place on TX1 for a link originating at primary switch 1 and TX2 for a link originating at primary switch 2 and so on.

It has already been mentioned that the condition of a bridge is determined by means of a scanner which in effect tests the condition of contacts B5, Fig. 5, and produces an output PIA. The seizing of the appropriate bridge is effected by sending a pulse to the H tube during the period of the corresponding bridge register. This means that the first H tube will be primed with TB1.TA(1+2), the second with TB1.TA(3+4) and the third with TB2.TA(1+2) and so on. The seizing pulse however only lasts for one TA period so that if the first bridge is the one to be seized, the pulse may be sent in either TB1.TA1 or TB1.TA2. This allows discrimination to be effected as to the manner in which the bridge is to be used, i.e. in the normal direction with the calling subscriber connected to the "top" or the abnormal direction with the called subscriber connected to the "top." The tube ND is primed with TA(1+3) and the tube AD with TA(2+4) and thus the bridge seizing pulse chooses the bridge and also operates either ND or AD as required. The tubes FC and SC which determine whether the first or second choice link is to be used are primed with TA3 and TA4 and a special pulse is sent to effect their operation as already described. The tubes for relays ST, CS and RD are primed with TA1, TA2 and TA3 respectively and are also operated by a separate pulse PL6 produced by relay MAG.

It has already been explained that when dialling is completed and the information registered is transferred to the transfer track, the calling and called parties' staticizers are set and action is taken to fill the summation track. This filling operation is initiated by a marking in TX2.TY6 on the transfer track which is produced on the operation of relay MBC. The marking effects the setting of relay MDG by circuit 74 and resetting takes place by circuit 75, while writing in of the information as to links marked busy in the different transmission bridge registers is effected by circuit 76 namely:

$$SLA.MDG.TY(1\text{–}5)\text{–}SBZ$$

It will be recalled that the 10 first choice links are dealt with in two TY blocks of TA1 and TA3 and similarly the 10 second choice links in the same two TY blocks of TA3 and TA4. It is desirable that this writing operation should take place for a complete revolution in order to gather up all the information and as each bridge register is dealt with, a marking is made in the circuit:

$$\underline{MCD}.SLT.TX2.TY6.TA2\text{–}SBA \qquad (120)$$

which indicates that the information has been collected from the particular register. The term $\underline{MCD}$ in this circuit is to ensure that the operation shall not continue when the extinguishing pulse is effective.

When a complete revolution has taken place so that the summation track has had time to fill, the first TX2.TY6 marking in a transmission bridge register will be encountered and relay MAE is operated in the circuit:

$$\underline{MFE}.SLA.TX2.TY6.TA2\text{–}MAE \qquad (121)$$

This effects a marking in position TX5.TY6 of the bridge register to indicate that the bridge, or rather pair of bridges, has been tested:

$$MAE.TX5.TY6.TA2\text{–}SBA \qquad (122)$$

In order that the same bridge shall not be tested twice, this marking serves to reset relay MAE in the circuit:

$$SLA.TX5.TY6.TA2\text{–}\underline{MAE} \qquad (123)$$

These control markings are made non-regenerative by the circuit:

$$TX(2+5).TY6.TA2\text{–}SAA \qquad (124)$$

While a test is being made, that is to say relay MAE is operated, use is made of the TYR waveforms to find which links are available to this pair of bridges. If among them there is one which goes to the right primary switch as indicated by SZA, and if it is free as indicated by absence of a marking in the summation track, the relay MBE is set in the circuit:

$$MAE.TYR1.SZA.\underline{SLZ}\text{–}MBE \qquad (125)$$

This represents the case in which the calling subscriber is connected to the "top" of the bridge while if the called subscriber is to be connected to the "top" of the bridge i.e. reverse connection, the circuit is:

$$MAE.TYR1.SZD.\underline{SLZ}\text{–}MCE \qquad (126)$$

Similarly as regards a connection to the "bottom" of the bridge, for the calling subscriber the circuit is:

$$MAE.MCE.TYR2.SZA.\underline{SLZ}\text{–}MDE \qquad (127)$$

and for the called subscriber:

$$MAE.MBE.TYR2.SZD.\underline{SLZ}\text{–}MEE \qquad (128)$$

It will be appreciated that there are now two possibilities of completing a call, i.e. the straight or normal connection with the calling subscriber at the "top" of the bridge and the called subscriber at the "bottom" in which case MBE and MEE are operated, or the reverse or abnormal combination in which case MCE and MDE are operated. If both possibilities exist, the normal connection is used and therefore relay MCE is restored in the circuit:

$$MBE.TYR2.SZD.\underline{SLZ}\text{–}\underline{MCE} \qquad (129)$$

At the same time as the link test is being performed, use is made of the bridge scanner waveform PIA and if the first bridge of a pair is free, a marking is made on the summation track in the circuit:

$$MAE.PIA.TX3.TY6.TA2\text{–}SBZ \qquad (130)$$

This marking is made non-regenerative by the circuit:

$$TX3.TY6.TA2\text{–}SAZ \qquad (131)$$

Thus it is established that a satisfactory route exists if either MBE and MEE are operated or MCE and MDE, and that the first bridge is free if coincidence circuit SLZ.TX3.TY6.TA4 is effective and that the second is free if the circuit PIA.TX3.TY6.TA4 is effective. The seizing circuit is therefore:

$\underline{MFE}$(MBE.MEE+MCE.MDE).(SLZ+PIA).TX3.TY6.TA4–MFE (132)

The operation of MFE causes a marking to be made on the summation track indicating that a bridge has been found:

MFE.TX5.TY6.TA4–SBZ (133)

and this marking serves to stop the hunting operation by restoring relay MAE in the circuit:

SLZ.TX5.TY6.TA2–$\underline{MAE}$ (134)

It may be mentioned that there might appear to be some conflict between the circuits just mentioned in that one contains the term TA4 and the other the term TA2. This however is due to the fact that the summation track only extends for two TA intervals so that TX5.TY6.TA2 and TX5.TY6.TA4 both pick out the same marking in the summation track but this is done by the two circuits on alternate scans.

The position which has now been reached is that there is a marking in the summation track indicating "bridge found" and a marking in the transfer track indicating "called subscriber pulsed." The coincidence of these two now operates relay MAG in circuit 92 previously mentioned, namely:

SLZ.SLT.TX5.TY6.TA4–MAG and after this relay has sent a pulse PL6 for operating the start tube, it is restored by the reset circuit 91:

TX4.TY6–$\underline{MAG}$

In view of the term TA4, the pulse produced by this operation of MAG occurs in TA1 as previously explained.

When it has been decided that a particular pair of bridges includes suitable links, pulsing out takes place in accordance with the particular one of the pair which is to be used and also whether the call is to be straight or reverse. Thus TA1 represents the first bridge for a straight connection, TA2 the first bridge for a reverse connection, TA3 the second bridge for a straight connection and TA4 the second bridge for a reverse connection. Selection is made by relays MAF and MBF, the former being operated for a straight connection in the circuit:

$\underline{MAF}$.MBE.MEE.TX5.TY6.TA4–MAF (135)

while relay MBF is operated if the first bridge is free in the circuit:

$\underline{MBF}$.SLZ.TX3.TY6.TA4–MBF (136)

The four possibilities for the pulse PL4 are then provided in the circuits:

MFE.MAF.MBF.TA1–PL4 (137)

MFE.$\underline{MAF}$.MBF.TA2–PL4 (138)

MFE.MAF.$\underline{MBF}$.TA3–PL4 (139)

MFE.$\underline{MAF}$.$\underline{MBF}$.TA4–PL4 (140)

At this time the equivalent of a second testing operation is performed but now it serves to mark the links which will be used, the availability of which has been confirmed during the first test. For this purpose use is made of the TYR1L and TYR2L waveforms. The circuits which come in question are as follows:

MFE.$\underline{SLZ}$.MAF.MBF.TA(1+2).TYR1L.SZA.$\underline{MBE}$–SBA (141)

MFE.$\underline{SLZ}$.MAF.MBF.TA(3+4).TYR1L.SZA.$\underline{MBE}$–SBA (142)

MFE.$\underline{SLZ}$.MAF.MBF.TA(1+2).TYR2L.SZD.$\underline{MEE}$–SBA (143)

MFE.$\underline{SLZ}$.MAF.$\underline{MBF}$.TA(3+4).TYR2L.SZD.$\underline{MEE}$–SBA (144)

MFE.$\underline{SLZ.MAF}$.MBF.TA(1+2).TYR2L.SZA.$\underline{MDE}$–SBA (145)

MFE.$\underline{SLZ.MAF.MBF}$.TA(3+4).TYR2L.SZA.$\underline{MDE}$–SBA (146)

MFE.$\underline{SLZ.MAF}$.MBF.TA(1+2).TYR1L.SZD.$\underline{MCE}$–SBA (147)

MFE.$\underline{SLZ.MAF.MBF}$.TA(3+4).TYR1L.SZD.$\underline{MCE}$–SBA (148)

The inclusion of the term MFE in these circuits ensures that writing only takes place while pulsing out to a bridge is occurring. It will also be noted that the term MBF is always associated with TA(1+2) and $\underline{MBF}$ with TA(3+4) and this ensures that the correct register of the two is selected. Furthermore MAF is always associated with the appropriate circuit for a straight call (TYR1L.SZA or TYR2L.SZD) and $\underline{MAF}$ with the circuit for a reverse call (TYR1L.SZD or TYR2L.SZA). The elements $\underline{SLZ}$, TYR1L and SZA or their variants serve the same purpose as in the hunting process to find the appropriate link. The final term such as $\underline{MBE}$ ensures that if the first choice link is free, that only is marked busy and not the second choice link as well if that happens to be free also. The relays MBE, MCE, MDE and MEE which come in question in this particular connection are the ones which did the original testing and it may be pointed out that the operating circuits in the two cases are very similar, for instance, MAE.TYR1.SZA.$\underline{SLZ}$–MBE (circuit 125) and MFE.TYR1L.SZA.$\underline{SLZ}$–MBE (149)

The first of these circuits is used for hunting under the control of MAE and the second during the writing operation under the control of MFE.

The other corresponding writing circuits are:

MFE.TYR1L.SZD.$\underline{SLZ}$–MCE (150)

MFE.MCE.TYR2L.SZA.$\underline{SLZ}$–MDE (151)

MFE.MBE.TYR2L.SZD.$\underline{SLZ}$–MEE (152)

The next point which arises in route selection is to determine whether the subscribers are to use the first choice or the second choice links. As already pointed out, the first choice links are dealt with in the odd TA's and second choice in the even TA's so if a suitable link is encountered in TA3 during the hunting operation, it is noted that the first choice link is available by the operation of relay MAF:

MAE.TYR1.SZA.$\underline{SLZ}$.TA3–MAF (153)

The operation of this relay indicates that the calling subscriber can be connected by a first choice link if it is decided that the connection is to be straight. A similar first choice link for the calling subscriber if the connection is to be reverse is noted by the operation of relay MCF in the circuit:

MAE.TYR2.SZA.$\underline{SLZ}$.TA3–MCF (154)

These relays then make suitable markings in the summation track in the circuits:

MAE.MAF.TX3.TY6.TA3–SBZ (155)

MCF.TX4.TY6.TA3–SBZ (156)

Similar operations are performed for the called subscriber under the control of relays MBF and MDF. The appropriate circuits being:

MAE.TYR1.SZD.$\underline{SLZ}$.TA3–MBF (157)

MAE.TYR2.SZD.$\underline{SLZ}$.TA3–MDF (158)

MAE.MBF.TX1.TY6.TA4–SBZ (159)

MDF.TX2.TY6.TA4–SBZ (160)

As long as hunting continues, the retention of this information serves no useful purpose since it may be changing and it is therefore erased on the next scan in the circuits:

$$MAE.TX(1+2).TY6.TA4\text{–}SAZ \quad (161)$$

$$MAE.TX(3+4).TY6.TA3\text{–}SAZ \quad (162)$$

As soon as the seizing of the bridge takes place, however, the information for the called subscriber is used straight away to effect the operation of relay MEF if the first choice is being used, two circuits being required according as the call is straight or reverse.

$$MFE.MAF.SLZ.TX1.TY6.TA2\text{–}MEF \quad (163)$$

$$MFE.\overline{MAF}.SLZ.TX2.TY6.TA2\text{–}MEF \quad (164)$$

The distinction between straight and reverse calls is made in these circuits by the condition of relay MAF. The pulse PL3 for operating the appropriate tube is now obtained in the circuits:

$$MFE.MEF.TA3\text{–}PL3 \quad (165)$$

$$MFE.\overline{MEF}.TA4\text{–}PL3 \quad (166)$$

the circuits distinguishing between the first and second choice tubes by the condition of relay MEF and the fact that the tubes FC and SC are primed with TA3 and TA4 respectively.

As regards the calling subscriber, the information relating to first or second choice for completing the connection to his line needs to be stored on the summation track until the second half of the setting operation, that is to say until the switches for connecting with the called subscriber have been operated. At this stage however it has already been determined whether the call is to be completed straight or reverse so that it is now possible to remove the markings which refer to the other type of connection. This is done by the circuits:

$$MFE.MAF.TX4.TY6.TA1\text{–}SAZ \quad (167)$$

$$MFE.\overline{MAF}.TX3.TY6.TA1\text{–}SAZ \quad (168)$$

At this time relay MBG is operated from the "calling subscriber pulsed" marking in the transfer track in the circuit:

$$SLT.TX3.TY6.TA1\text{–}MBG \quad (169)$$

The operation of relay MBG now brings about the operation of relay MEF if a first choice link is to be used:

$$MBG.SLZ.TX(3+4).TY6.TA1\text{–}MEF \quad (170)$$

and a further pulse PL3 for operating the appropriate tubes for connecting to the calling party is now transmitted in the circuits:

$$MBG.MEF.TA3\text{–}PL3 \quad (171)$$

$$MBG.\overline{MEF}.TA4\text{–}PL3 \quad (172)$$

The connection is now fully established due to the operation of the switches of Figs. 3–5 and conversation may take place as soon as the called party replies.

If the connection cannot be set up because there are no free links available, this fact is detected in the circuit:

$$MAE.SLA.TX5.TY6.TA2\text{–}MEF \quad (173)$$

which is effective if the testing operation (relay MAE operated) is still progress when the bridge from which the hunt started is again encountered. The all-links-busy condition is treated on the same basis as a called subscriber busy, that is to say repeated tests are made to find a route over which the call can be set up. For this purpose a marking is made on the transfer track in position TX4.TY5 i.e. the marking which has been referred to as "called subscriber busy" and is made if the called subscriber actually is busy. In this case it is done in the circuit:

$$\overline{MBG}.\overline{MFE}.MEF.TX4.TY5\text{–}SBT \quad (174)$$

The terms $\overline{MBG}$ and $\overline{MFE}$ are included in order to distinguish from the operation of relay MEF for other functions. The operations for repeated testing now take place as previously indicated.

At the end of the call when a transmission bridge becomes free on the parties hanging up, it is necessary to clear its register of the markings indicating the links over which the call was set up. This is effected under the control of relay MCG which is operated if the bridge corresponding to the following register is free (output PIA from the bridge scanner) in the circuit:

$$TW(4+5).PIA.TX1.TY6.TA(2+4)\text{–}MCG \quad (175)$$

This is reset if the setting up of a call is in progress by the "fill summation track" marking in the transfer track:

$$SLT.TX2.TY6\text{–}MCG \quad (176)$$

and is also provided with a normal reset circuit which is operative at the end of each transmission bridge register:

$$TX5.TY5.TA(2+4)\text{–}MCG \quad (177)$$

While it is operated however, it completes the circuit:

$$TW(4+5).TY(1\text{–}5).MCG.SAA \quad (178)$$

This clears the markings representing busy links, and the control markings which are employed in TY6 are in any event arranged to be non-regenerative so that the transmission bridge register is completely cleared.

I claim:

1. In a telephone system, a plurality of lines, a plurality of ranks of automatic crossbar switches for completing speaking connections between any two of said lines, a plurality of links interconnecting the switches in different ranks, a plurality of transmission bridges each connected between the outlets of a pair of switches of the final rank, a surface of magnetic material, means for moving said surface in a closed path, means synchronised with the movement of said surface for scanning said lines and said links for busy or idle condition and means responsive to said scanning operation for making a continuous record on said surface of the condition of said lines and links.

2. In a telephone system, a plurality of lines, a plurality of automatic switches for completing speaking connections between any two of said lines, a surface of magnetic material, means for moving said surface in a closed path, means for making a continuous record on said surface of the busy or idle condition of each of said automatic switches, means for making a record on said surface of signals transmitted over a calling one of said lines and representing a called one of said lines, and means controlled jointly by said records for selecting the switches to be used and for operating said selected switches to set up a connection between said calling and called lines.

3. In a telephone system, a plurality of lines, a plurality of automatic switches for completing speaking connections between any two of said lines, a surface of magnetic material, means for moving said surface in a closed path, means for making a continuous record on said surface of the busy or idle condition of each of said automatic switches, means for making a record on said surface of signals transmitted over a calling one of said lines and representing a called one of said lines and means controlled jointly by said records for selecting the switches to be used and for effecting the direct operation of said selected switches to set up a connection between said calling and called lines.

4. In a telephone system, a plurality of lines, a plurality of automatic switches for completing speaking connections between any two of said lines, a surface of magnetic material, means for moving said surface in a closed path, means for making a continuous record on said surface of the busy or idle condition of each of said automatic switches, means for making a record on said surface in a position characteristic of a calling one of said lines of signals transmitted thereover representing a called one of said lines, and means controlled jointly by said records for selecting the switches to be used and for operating said selected switches to set up a connection between said calling and called lines.

5. In a telephone system, a plurality of lines, a plurality of ranks of automatic switches for completing speaking connections between any two of said lines, a plurality of links interconnecting the switches of different ranks, a surface of magnetic material, means for moving said surface in a closed path, means for making a continuous record on said surface of the busy or idle condition of each of said links, means for making a record on said surface of signals transmitted over a calling one of said lines and representing a called one of said lines, and means controlled jointly by said records for selecting the links to be used for setting up a connection between said calling and called lines.

6. In a telephone system, a plurality of lines, a plurality of automatic switches for completing speaking connections between any two of said lines, a drum having a surface of magnetic material, means for rotating said drum about its axis, a plurality of writing heads co-operating with said drum to define a like plurality of circumferential tracks thereon, a like plurality of reading heads also co-operating respectively with said tracks, means including one of said writing heads for making a record on the associated track of the busy or idle condition of each of said automatic switches, means including another of said writing heads for making a record on the associated track of the identity of a calling one of said lines and a record of signals transmitted thereover representing a called one of said lines, and means including said reading heads controlled jointly by said records for selecting the switches to be used and for operating said switches to set up a connection between said calling and called lines.

7. In a telephone system, a plurality of lines, a plurality of ranks of crossbar switches, electromagnets in said switches, links interconnecting said switches of different ranks over which speaking connections between any two of said lines may be completed in response to the energisation of the appropriate electromagnets, a drum having a surface of magnetic material, means for rotating said drum about its axis, a plurality of writing heads co-operating with said drum to define a like plurality of circumferential tracks thereon, a like plurality of reading heads also co-operating respectively with said tracks, means including one of said writing heads for making a continuous record on the associated track of the busy or idle condition of said links, means including another of said writing heads for making a record on said track of signals transmitted over a calling one of said lines and representing a called one of said lines, and means including said reading heads controlled jointly by said records for selecting the switches to be used and for selectively operating the electromagnets thereof to set up a connection between said calling and called lines.

8. In a telephone system, a plurality of lines, a plurality of ranks of automatic switches for completing speaking connections between any two of said lines, a surface of magnetic material, means for moving said surface in a closed path, means for making a record on said surface of signals transmitted over a calling one of said lines and representing a called one of said lines, a plurality of transmission bridges each connected between a pair of switches of the one rank, the switches of said pair being used for extending connections to the calling and called lines respectively, outlets from said one rank of switches extending to the switches of another rank, means for making a record on said surface of the busy or idle condition of said outlets from the switches of said one rank, and means jointly controlled by said records for selecting the transmission bridge to be used for setting up the desired connection and determining which switch of the associated pair is to be used for connecting with the calling part.

9. In a telephone system, a plurality of lines, a plurality of ranks of automatic switches for completing speaking connections between any two of said lines, a plurality of links connecting the switches of different ranks, a surface of magnetic material, means for moving said surface in a closed path, means for making a record on said surface of signals transmitted over a calling one of said lines and representing a called one of said lines, a plurality of transmission bridges from opposite ends of which connections are extended over said switches and said links to calling and called lines respectively, each of said links being accessible to a plurality of transmission bridges in common, means for making a record on said surface of the busy or idle condition of said links, and means jointly controlled by said records for selecting the links to be used for setting up a connection between said calling and called lines.

10. In a telephone system, a plurality of lines, a plurality of ranks of automatic switches for completing speaking connections between any two of said lines, a plurality of links connecting said switches in different ranks, a drum having a surface of magnetic material, means for rotating said drum about its axis, a plurality of writing heads co-operating with said drum to define a like plurality of circumferential tracks thereon, means including one of said writing heads for making a record on the associated track of signals transmitted over a calling one of said lines and representing a called one of said lines, a plurality of transmission bridges from opposite ends of which connections are extended over said switches and said links to calling and called lines respectively, each of said links being accessible to a plurality of transmission bridges in common, means including another of said writing heads for making a continuous record in storage space individual to said transmission bridges of the busy or idle condition of the links respectively accessible thereto, means effective to the initiation of a call for assembling a record of the busy or idle condition of all said links in storage space common to all said transmission bridges, and means jointly controlled by said last mentioned record and said record representing a called line for selecting the links to be used for setting up a connection between said calling and called lines.

11. In a telephone system, a plurality of lines, primary and secondary crossbar switches for completing speaking connections between any two of said lines, a plurality of links interconnecting said primary and secondary switches, a drum having a surface of magnetic material, means for rotating said drum about its axis, first, second and third writing heads co-operating with said drum to define corresponding circumferential tracks thereon, means including said first writing head for making a record on said track of signals transmitted over a calling one of said lines and representing a called one of said lines, a plurality of transmission bridges from opposite ends of which connections are extended over said primary and secondary switches to calling and called lines respectively, means including said second writing head for making a continuous record in storage space individual to said transmission bridges of the busy or idle condition of the links accessible thereto, means including said third writing head effective on the initiation of a call for assembling a record of the busy or idle condition of all said links in storage space common to all said transmission bridges, and means jointly controlled by said last mentioned record and said record representing a called line for selecting the links to be used for setting up a connection between said calling and called lines, and operating said primary and secondary switches to complete said connection.

12. A telephone system as claimed in claim 9 in which means are provided for testing whether a connection to a called line can be extended from one end of a transmission bridge and if this is impossible because there is no idle link available therefrom, further means test whether the connection can be extended from the other end of the transmission bridge.

13. A telephone system as claimed in claim 7 in which both primary and secondary crossbar switches are provided with two additional levels over one or other of which a connection is always extended so as to give a wiper switching effect.

14. A telephone system as claimed in claim 7 in which the magnets of the crossbar switches are arranged to be operated in series with three-electrode gas discharge tubes to the trigger electrodes of which suitable potentials are applied when operation of the tube is desired.

15. A telephone system as claimed in claim 14 in which a series of tubes for controlling selective operation of the magnets are arranged to be individually primed successively with timed pulses and then to be supplied collectively with an operating pulse whereupon only that tube which is then primed is operated and selection is effected in accordance with the time position of the operating pulse.

16. A telephone system as claimed in claim 15 in which the selected tube is arranged to be struck initially in series with a high resistance individual thereto so as to light dimly, the different individual resistances being subsequently shunted respectively by a plurality of electromagnetic devices whereupon only the device associated with the lighted tube is operated and the tube then burns brightly.

17. A telephone system as claimed in claim 6 in which individual storage space is provided on said drum corresponding to each of said plurality of lines and a calling line is identified by the particular storage space in which a record is made representing a called line.

18. A telephone system as claimed in claim 17 in which identification of the storage space corresponding to a called number is effected by comparing the output from the registration of said called number with a waveform including all the various possible numbers which waveform is related in phase and repetition frequency to the rotation of said drum.

References Cited in the file of this patent

UNITED STATES PATENTS

| | | |
|---|---|---|
| 2,860,155 | Molnar | June 1, 1954 |
| 2,711,444 | Oberman | June 21, 1955 |
| 2,764,634 | Brooks et al. | Sept. 25, 1956 |